(12) United States Patent
Sato et al.

(10) Patent No.: US 9,618,062 B2
(45) Date of Patent: Apr. 11, 2017

(54) CLUTCH UNIT

(71) Applicants: Koji Sato, Shizuoka (JP); Takahide Saito, Shizuoka (JP); Masahiro Kawai, Shizuoka (JP); Kouji Isoda, Shizuoka (JP); Naochika Kubota, Shizuoka (JP); Yumiko Mineno, Shizuoka (JP); Hiromitsu Hamazaki, Mie (JP)

(72) Inventors: Koji Sato, Shizuoka (JP); Takahide Saito, Shizuoka (JP); Masahiro Kawai, Shizuoka (JP); Kouji Isoda, Shizuoka (JP); Naochika Kubota, Shizuoka (JP); Yumiko Mineno, Shizuoka (JP); Hiromitsu Hamazaki, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/707,394

(22) Filed: May 8, 2015

(65) Prior Publication Data
US 2015/0240898 A1   Aug. 27, 2015

Related U.S. Application Data

(62) Division of application No. 13/576,434, filed as application No. PCT/JP2011/054579 on Mar. 1, 2011, now Pat. No. 9,074,644.

(30) Foreign Application Priority Data

Mar. 15, 2010 (JP) .................................. 2010-057370
Jul. 22, 2010 (JP) .................................. 2010-165085
Jul. 29, 2010 (JP) .................................. 2010-170924

(51) Int. Cl.
*F16D 43/02* (2006.01)
*F16D 41/10* (2006.01)
(Continued)

(52) U.S. Cl.
CPC ............. *F16D 43/02* (2013.01); *B60N 2/167* (2013.01); *B60N 2/168* (2013.01); *B60N 2/1615* (2013.01); *B60N 2/444* (2013.01); *F16D 41/105* (2013.01)

(58) Field of Classification Search
CPC ...... F16D 41/086; F16D 41/088; F16D 67/02; F16D 2041/0605; F16D 41/105;
(Continued)

(56) References Cited

U.S. PATENT DOCUMENTS 2,884,101 A    4/1959 Warn
5,743,350 A    4/1998 Yamawaki et al.
(Continued)

FOREIGN PATENT DOCUMENTS

CN    1345276    4/2002
CN    1854563    11/2006
(Continued)

OTHER PUBLICATIONS

International Search Report issued May 24, 2011 in International (PCT) Application No. PCT/JP2011/054579.
(Continued)

*Primary Examiner* — Richard Lorence
(74) *Attorney, Agent, or Firm* — Wenderoth, Lind & Ponack, L.L.P.

(57) ABSTRACT

A clutch unit includes a lever-side clutch portion for controlling transmission and interruption of rotational torque to an output side through lever operation, and a brake-side clutch portion for transmitting torque input from the lever-side clutch portion to the output side and for interrupting torque reversely input from the output side. The lever-side clutch portion has an outer centering spring provided between a lever-side outer ring to be rotated through the lever operation and a cover restricted in rotation, for accu-
(Continued)

mulating an elastic force obtained by torque input from the lever-side outer ring and for restoring the lever-side outer ring to a neutral state with the accumulated elastic force through releasing of the torque input from the lever-side outer ring.

4 Claims, 38 Drawing Sheets

(51) Int. Cl.
 *B60N 2/16* (2006.01)
 *B60N 2/44* (2006.01)
(58) Field of Classification Search
 CPC ......... F16D 43/02; B60N 2/167; B60N 2/168; B60N 2/1615; B60N 2/444
 USPC ............... 192/223.2, 15, 19, 44; 297/344.12, 297/344.15
 See application file for complete search history.

(56) References Cited

U.S. PATENT DOCUMENTS

| | | | |
|---|---|---|---|
| 6,000,512 | A | 12/1999 | Cronin et al. |
| 6,481,557 | B2 | 11/2002 | Denis |
| 6,648,119 | B1 | 11/2003 | Klingler |
| 6,955,251 | B2 * | 10/2005 | Kurita .................. B60N 2/1615 192/19 |
| 2006/0211500 | A1 | 9/2006 | Louis et al. |
| 2010/0175962 | A1 | 7/2010 | Kawai et al. |
| 2011/0005881 | A1 | 1/2011 | Kawai et al. |

FOREIGN PATENT DOCUMENTS

| | | |
|---|---|---|
| CN | 101317022 | 12/2008 |
| JP | 34-9211 | 10/1959 |
| JP | 09-020257 | 1/1997 |
| JP | 2002-54648 | 2/2002 |
| JP | 2003-093187 | 4/2003 |
| JP | 2008-075776 | 4/2008 |
| JP | 2009-210114 | 9/2009 |
| JP | 2010-019343 | 1/2010 |
| JP | 2010-025206 | 2/2010 |

OTHER PUBLICATIONS

International Preliminary Report on Patentability and Written Opinion of the International Searching Authority issued Nov. 1, 2012 in International (PCT) Application No. PCT/JP2011/054579.
Chinese Office Action issued Sep. 2, 2014 in corresponding Chinese Patent Application No. 201180013972.9 with English translation.
English translation of JP 2010-025206A downloaded from proquest. com on Jun. 28, 2014, having a publication date of Feb. 4, 2010.

* cited by examiner

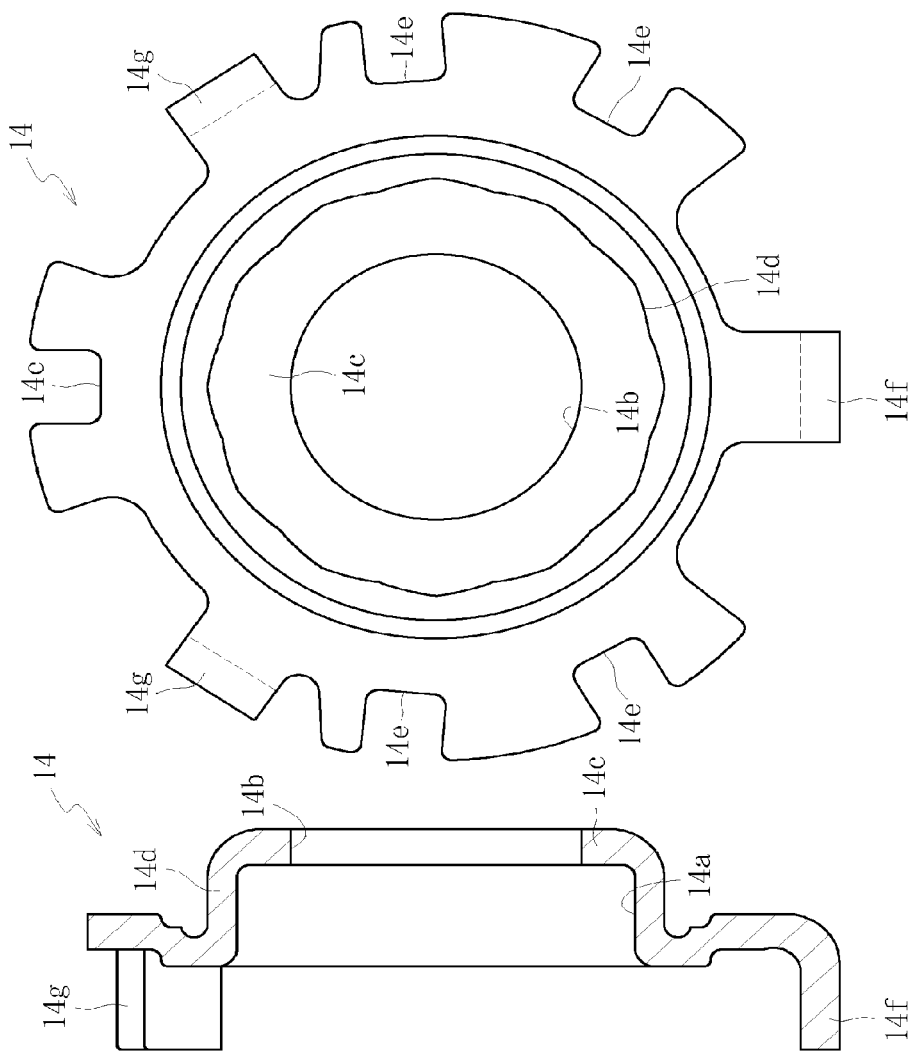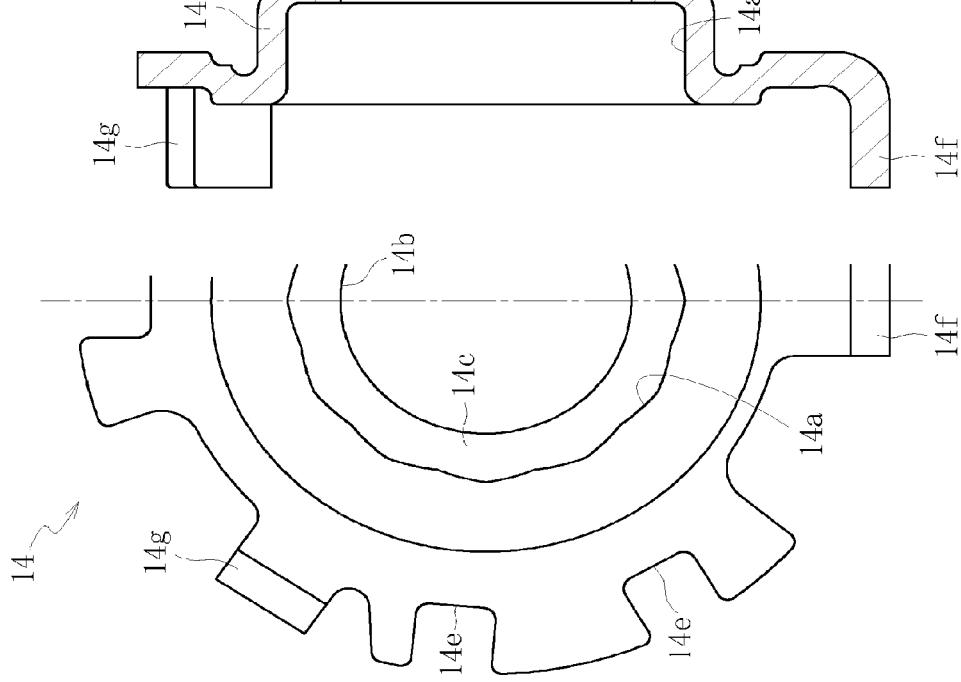

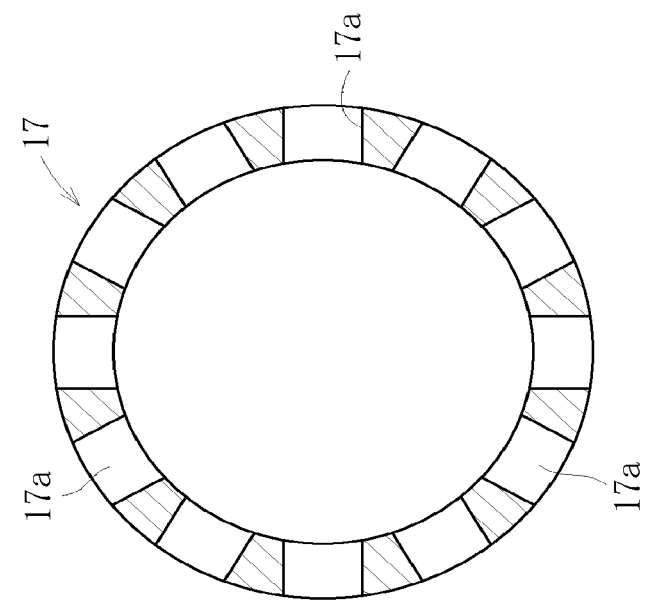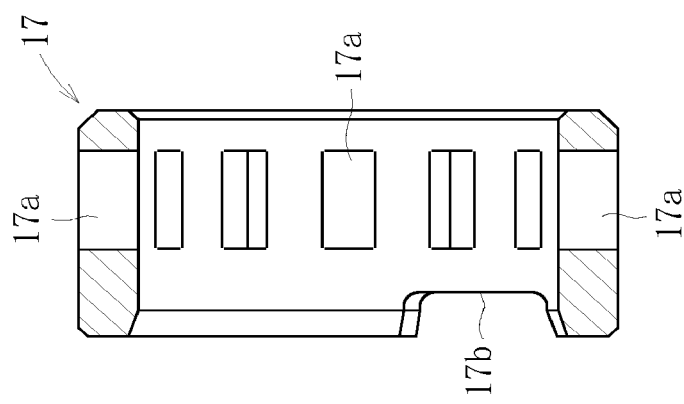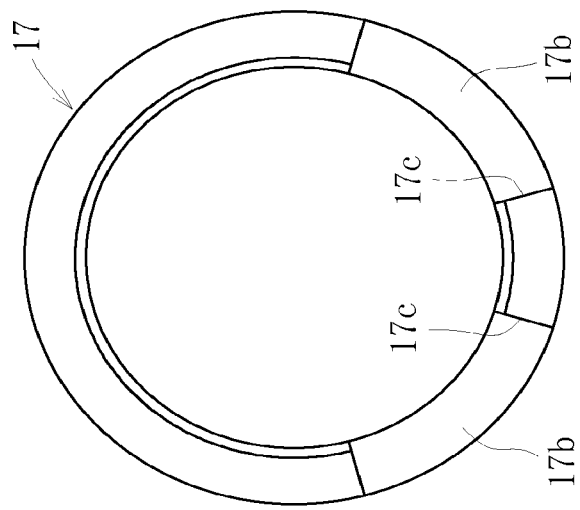

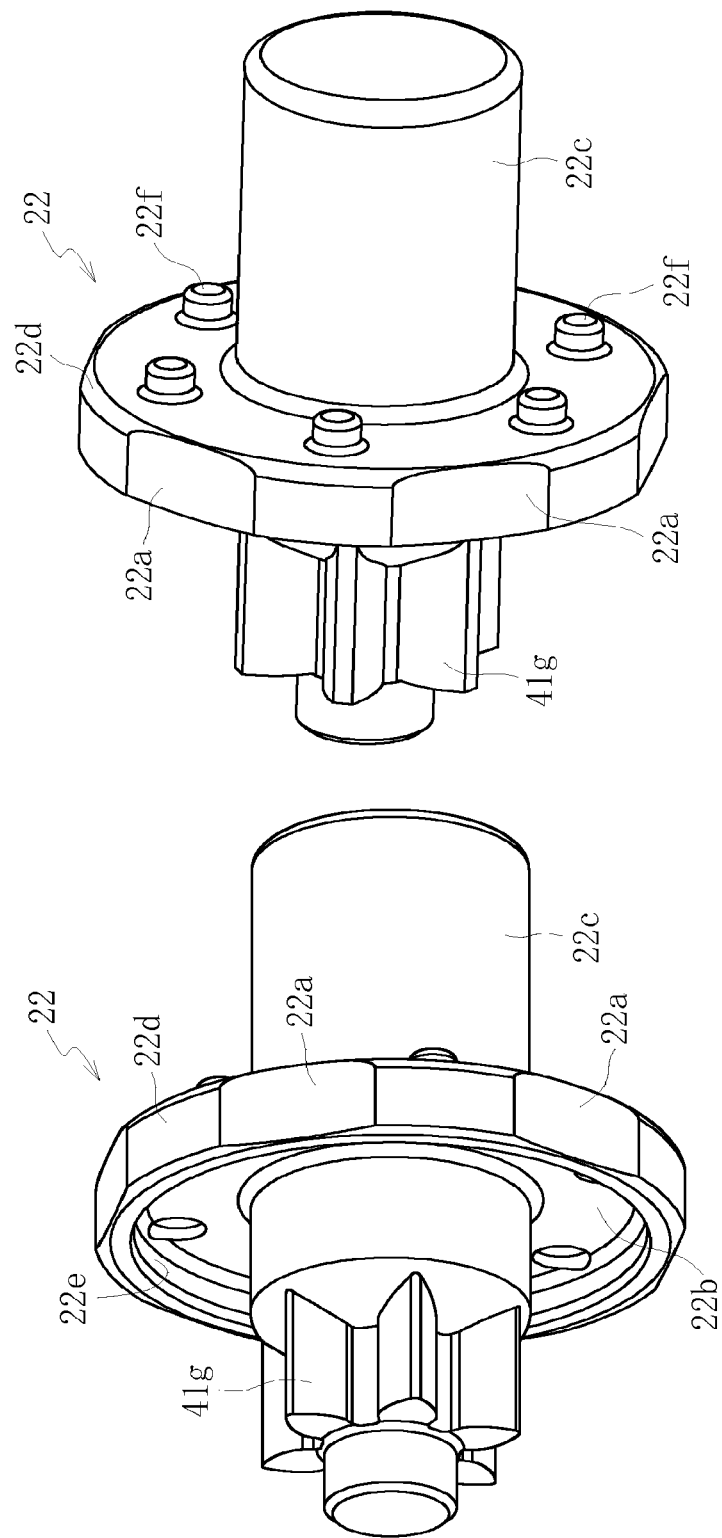

Fig. 16a
Fig. 16b
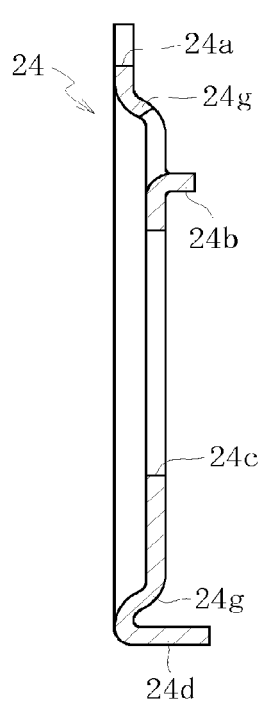
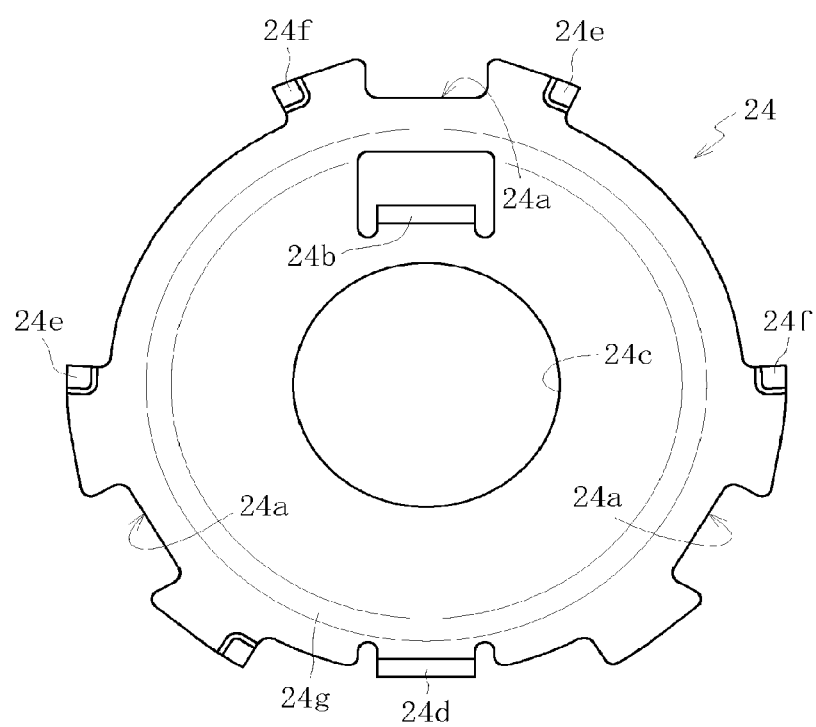

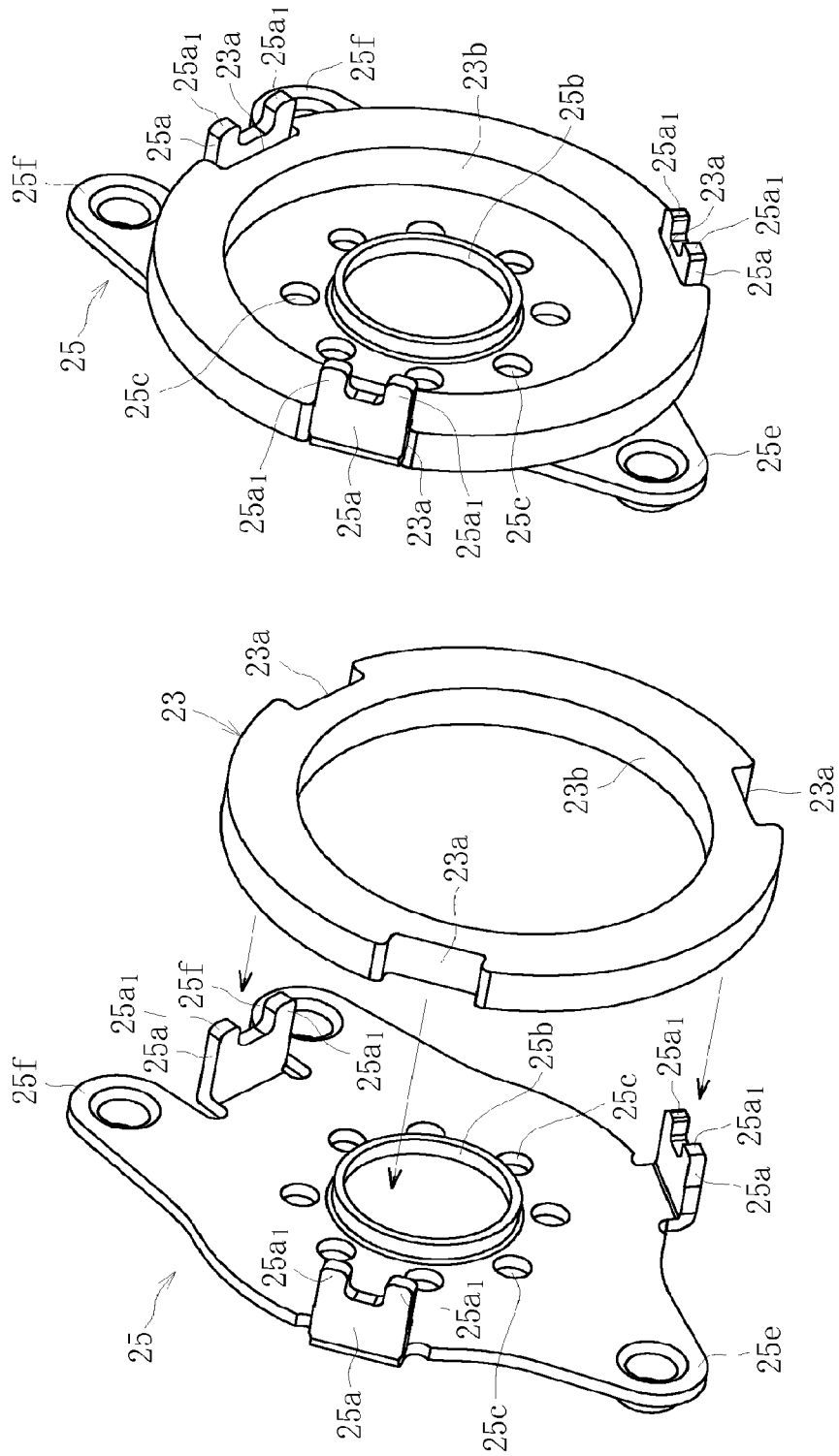

ific clutch unit having a
CLUTCH UNIT

TECHNICAL FIELD

The present invention relates to a clutch unit having a lever-side clutch portion for transmitting rotational torque from an input side to an output side thereof and a brake-side clutch portion for transmitting rotational torque from the input side to the output side and interrupting torque reversely input from the output side.

BACKGROUND ART

In general, in a clutch unit using engagement elements such as cylindrical rollers or balls, a clutch portion is arranged between an input-side member and an output-side member. Further, in the clutch portion, the engagement elements such as cylindrical rollers or balls are engaged and disengaged with respect to wedge gaps formed between the input-side member and the output-side member, thereby controlling transmission and interruption of the input torque.

The applicant of the present invention has previously proposed a clutch unit incorporated into, for example, an automobile seat-lifter section which vertically adjusts a seat through lever operation. This clutch unit is provided with a lever-side clutch portion for transmitting rotational torque from the input side to the output side and a brake-side clutch portion for transmitting rotational torque from the input side to the output side and interrupting torque reversely input from the output side (see, for example, Patent Literature 1).

FIG. 40 is a longitudinal sectional view of an overall structure of the conventional clutch unit disclosed in Patent Literature 1, FIG. 41 is a sectional view taken along the line D-D of FIG. 40, and FIG. 42 is a sectional view taken along the line E-E of FIG. 40.

As illustrated in FIGS. 40 and 41, a lever-side clutch portion 111 mainly includes a lever-side outer ring 114 serving as an input-side member to which torque is input through lever operation, an inner ring 115 serving as a coupling member for transmitting the torque from the lever-side outer ring 114 to a brake-side clutch portion 112, a plurality of cylindrical rollers 116 serving as engagement elements for controlling transmission and interruption of the torque input from the lever-side outer ring 114 through engagement and disengagement between the lever-side outer ring 114 and the inner ring 115, a retainer 117 for retaining the cylindrical rollers 116 at predetermined circumferential intervals, an inner centering spring 118 serving as a first elastic member which is provided between a brake-side outer ring 123 serving as a stationary-side member restricted in rotation and the retainer 117, for accumulating an elastic force obtained by the torque input from the lever-side outer ring 114 and restoring the retainer 117 to a neutral state with the accumulated elastic force through releasing of the input torque, and an outer centering spring 119 serving as a second elastic member which is provided between the lever-side outer ring 114 and the brake-side outer ring 123, for accumulating an elastic force obtained by the torque input from the lever-side outer ring 114 and restoring the lever-side outer ring 114 to the neutral state with the accumulated elastic force through releasing of the input torque.

Note that, in the figures, reference numeral 113 represents a lever-side side plate fixed to the lever-side outer ring 114 by swaging and constituting the input-side member together with the lever-side outer ring 114, and reference numeral 131 represents a washer mounted to an output shaft 122 through the intermediation of a wave washer 130.

Meanwhile, as illustrated in FIGS. 40 and 42, the brake-side clutch portion 112 mainly includes the brake-side outer ring 123 serving as a stationary-side member restricted in rotation, the inner ring 115 serving as a coupling member to which torque from the lever-side clutch portion 111 is input, and a plurality of pairs of cylindrical rollers 127 serving as engagement elements arranged in wedge gaps 126 between the brake-side outer ring 123 and the output shaft 122, for controlling transmission of torque input from the inner ring 115 and interruption of torque reversely input from the output shaft 122 through engagement and disengagement between the brake-side outer ring 123 and the output shaft 122.

Note that, there is provided a larger diameter portion 115c extending from an axial end portion of the inner ring 115 in a radially outer direction and bending in an axial direction. In order to cause the larger diameter portion 115c to function as a retainer for retaining the cylindrical rollers 127 at predetermined circumferential intervals, pockets 115e for accomodating the cylindrical rollers 127 and plate springs 128 are equiangularly formed. In the figures, reference numerals 124 and 125 respectively represent a cover and a brake-side side plate constituting the stationary-side member together with the brake-side outer ring 123, and the brake-side outer ring 123 and the cover 124 are integrally fixed to each other with the brake-side side plate 125 by swaging. Reference numeral 128 represents a plate spring of, for example, an N-shaped sectional configuration arranged between the cylindrical rollers 127 of each pair, and reference numeral 129 represents a friction ring serving as a braking member mounted to the brake-side side plate 125.

CITATION LIST

[PTL1] JP 2009-210114 A

SUMMARY OF INVENTION

Technical Problems

By the way, the conventional clutch unit disclosed in Patent Literature 1 has the following structure. Specifically, the stationary-side member includes the brake-side outer ring 123, the cover 124, and the brake-side side plate 125, and the brake-side outer ring 123 and the cover 124 are integrally fixed to each other with the brake-side side plate 125 by swaging. The conventional clutch unit also has the following structure. Specifically, when the lever-side outer ring 114 is rotated through lever operation, the outer centering spring 119 accumulates an elastic force obtained by torque input from the lever-side outer ring 114, and restores the lever-side outer ring 114 to a neutral state with the accummulated elastic force through releasing of the input torque. The outer centering spring 119 is provided between the lever-side outer ring 114 and the cover 124 constituting the stationary-side member together with the brake-side outer ring 123. The outer centering spring 119 is held in abutment on the cover 124.

In a case of the clutch unit having the above-mentioned structure, when the lever-side outer ring 114 is rotated through lever operation, the outer centering spring 119 accumulates an elastic force obtained by the torque input from the lever-side outer ring 114 and then increases in diameter. Then, at the time of lever operation of restoring a lever from a full stroke to a neutral position, the outer centering spring 119, which slides on the cover 124, may climb onto an inclined portion 124g of the cover 124 (see FIG. 40) and thus come into contact with the opposing lever-side outer ring 114. When the outer centering spring 119 climbs in this manner by sliding, the outer centering spring 119 comes into contact with the lever-side outer ring 114, with the result that slight noises may occur.

Further, as illustrated in FIG. 43, the above-mentioned outer centering spring 119 is a C-shaped and band-like plate spring which includes a pair of lock portions 119a formed by bending both ends thereof to a radially outer side. One of the lock portions 119a and the other of the lock portions 119a are formed in such a manner that one slit is formed in a center region of each end of the outer centering spring 119 in a peripheral direction and one of both side parts of the slit is bent to the radially outer side. Here, one of the lock portions 119a is formed by bending the side part on one side in a band-plate width direction, and the other of the lock portions 119a is formed by bending the side part on the other side in the band-plate width direction. Accordingly, at the time of application of input torque, such a moment force as to pivot the other of the lock portions 119a about a fulcrum set on the one of the lock portions 119a is more likely to be generated. As a result, a behavior of the outer centering spring 119 is not stabilized, which may cause occurrence of slight noises.

Therefore, it is an object of the present invention to provide a clutch unit capable of forestalling occurrence of noises caused at the time of lever operation by contact of the outer centering spring with the lever-side outer ring and by an unstable behavior of the outer centering spring.

Solution to Problems

A clutch unit according to the present invention comprises: a lever-side clutch portion provided on an input side, for controlling transmission and interruption of rotational torque to an output side through lever operation; and a brake-side clutch portion provided on the output side, for transmitting torque input from the lever-side clutch portion to the output side and for interrupting torque reversely input from the output side.

The lever-side clutch portion according to the present invention comprises: an input-side member to be rotated through the lever operation; and an elastic member provided between a stationary-side member restricted in rotation and the input-side member, for accumulating an elastic force obtained by torque input from the input-side member and for restoring the input-side member to a neutral state with the accumulated elastic force through releasing of the torque input from the input-side member. The stationary-side member comprises an inclined portion which abuts on the elastic member and swells to the elastic member side. The inclined portion is formed into a shape for controlling an amount of axial movement of the elastic member when the elastic member is restored to an initial state through the releasing of the torque input from the input-side member. Here, it is desired that the shape for controlling the amount of axial movement of the elastic member when the elastic member is restored to the initial state through the releasing of the torque input from the input-side member be formed on a rounded corner surface situated at an outermost diameter of the inclined portion or on an inclined surface extending radially inward from the outermost diameter of the inclined portion.

According to the present invention, the inclined portion is formed into the shape for controlling the amount of axial movement of the elastic member when the elastic member is restored to the initial state through releasing of the torque input from the input-side member. Thus, at the time of lever operation of restoring a lever from a full stroke to a neutral position, it is possible to prevent the elastic member, which slides on the stationary-side member, from climbing onto the inclined portion of the stationary-side member, and to avoid contact of the elastic member with the input-side member. Accordingly, it is possible to prevent occurrence of noises.

The lever-side clutch portion according to the present invention comprises: an input-side member to be rotated through the lever operation; and an elastic member provided between a stationary-side member restricted in rotation and the input-side member, for accumulating an elastic force obtained by torque input from the input-side member and for restoring the input-side member to a neutral state with the accumulated elastic force through releasing of the torque input from the input-side member. The elastic member comprises a C-shaped and band-like plate spring which comprises a pair of lock portions formed by bending both ends thereof to a radially outer side. One of the pair of lock portions and another of the pair of lock portions are formed at positions that are identical in a band-plate width direction. Here, it is desired that the one of the pair of lock portions and the another of the pair of lock portions be formed at center positions in the band-plate width direction or at both side positions in the band-plate width direction.

According to the present invention, the elastic member comprises the C-shaped and band-like plate spring which comprises the pair of lock portions formed by bending both the ends thereof to the radially outer side, and one of the pair of lock portions and another of the pair of lock portions are formed at positions that are identical in the band-plate width direction. Thus, each end of the elastic member is shaped to be symmetric with respect to a center line in a band-plate peripheral direction, and hence it is possible to prevent a moment force generated at the time of application of input torque. Accordingly, a behavior of the elastic member is stabilized, which can prevent occurrence of noises.

The brake-side clutch portion according to the present invention comprises: an output-side member from which torque is output; a stationary-side member restricted in rotation; a coupling member to which the torque is input from the lever-side clutch portion; and a plurality of pairs of engagement elements accommodated in pockets of the coupling member, for controlling transmission of the torque input from the coupling member and interruption of torque reversely input from the output-side member through engagement with and disengagement from wedge gaps formed between the stationary-side member and the output-side member. Any one of width dimensions of the pockets and outer diameter dimensions of the plurality of pairs of engagement elements are set different from one another.

According to the present invention, the width dimensions of the pockets are set different from one another or the outer diameter dimensions of the plurality of pairs of engagement elements are set different from one another. Thus, when the engagement elements are disengaged from the wedge gaps so as to release a locked state of the output-side member, not all the engagement elements are disengaged from the wedge gaps at the same time, but all the engagement elements are disengaged from the wedge gaps in a step-by-step manner. With this operation, even in a case where high load is applied to the output-side member, when the locked state of the output-side member is released, it is possible to avoid concentration of contact pressure, which is generated between the engagement elements due to high load applied to the output-side member, on the engagement element disengaged from the wedge gap last. Accordingly, it is possible to suppress concentration of the contact pressure generated between the engagement elements, and to prevent occurrence of noises at the moment at which the engagement elements are flipped.

According to the present invention, as means for making a difference among the width dimensions of the pockets, the following structure is desired: pockets having small widths and pockets having large widths are arranged alternately in a peripheral direction. With this structure, when the locked state of the output-side member is released, the engagement elements accommodated in the pockets having small widths are disengaged from the wedge gaps prior to the engagement elements accommodated in the pockets having large widths. Thus, all the engagement elements can be disengaged from the wedge gaps substantially one side at a time in a step-by-step and balanced manner, and concentration of the contact pressure generated between the engagement elements is suppressed easily.

According to the present invention, as means for making a difference among the outer diameter dimensions of the plurality of pairs of engagement elements, the following structure is desired: engagement elements having small diameters and engagement elements having large diameters are arranged alternately in a peripheral direction. With this structure, when the locked state of the output-side member is released, the engagement elements having small diameters are disengaged from the wedge gaps prior to the engagement elements having large diameters. Thus, all the engagement elements can be disengaged from the wedge gaps substantially one side at a time in a step-by-step and balanced manner, and concentration of the contact pressure generated between the engagement elements is suppressed easily.

In a case where the coupling member according to the present invention comprises seven or more pockets, it is desired that the seven or more pockets comprise three pockets having large widths and four or more pockets having small widths. With this structure, when the locked state of the output-side member is released, the engagement elements accommodated in the four or more pockets having small widths are disengaged from the wedge gaps, and then the engagement elements accommodated in the minimum necessary three remaining pockets having large widths are disengaged from the wedge gaps. As a result, concentration of the contact pressure generated between the engagement elements is suppressed easily.

In a case where the coupling member according to the present invention comprises seven or more pockets, it is desired that the seven or more pockets accommodate three pairs of engagement elements having large diameters and four or more pairs of engagement elements having small diameters. With this structure, when the locked state of the output-side member is released, the four or more pairs of engagement elements are disengaged from the wedge gaps, and then the minimum necessary three remaining pairs of engagement elements are disengaged from the wedge gaps. As a result, concentration of the contact pressure generated between the engagement elements is suppressed easily.

The brake-side clutch portion according to the present invention comprises: an output-side member from which torque is output; a stationary-side member restricted in rotation; a plurality of pairs of engagement elements arranged in wedge gaps between the stationary-side member and the output-side member, for controlling transmission of the torque input from the lever-side clutch portion and interruption of the torque reversely input from the output side through engagement and disengagement between the stationary-side member and the output-side member; and an elastomer member inserted between the engagement elements of each pair, for imparting a repulsive force to the engagement elements of each pair.

According to the present invention, the elastomer member, which is inserted between the engagement elements of each pair, for imparting the repulsive force to the engagement elements of each pair, can easily increase load applied to the engagement elements. Accordingly, even in a case where high load is applied to the output-side member, when the locked state of the output-side member is released, it is possible to forestall the situation that the elastomer member is to flip the engagement elements, and it is possible to inhibit occurrence of noises.

It is desired that the elastomer member according to the present invention have an outside dimension larger than a gap between the engagement elements of each pair, and be inserted in an elastically deformed state between the engagement elements of each pair. With this structure, an elastic restoring force of the elastomer member acts as a repulsive force to be imparted to the engagement elements, and hence the repulsive force is easily imparted to the engagement elements.

It is desired that the elastomer member according to the present invention have a columnar shape or a quadrangular prism shape, and have an axial dimension equal to or smaller than axial dimensions of the engagement elements of each pair. With this structure, owing to such a simple shape, a function of the elastomer member can be exerted. When the elastomer member has the axial dimension equal to or smaller than the axial dimensions of the engagement elements of each pair, the function of the elastomer member can be exerted reliably, which is effective.

It is desired that the elastomer member according to the present invention be made of any one of a thermosetting elastomer and an elastically deformable resin material. This selection of any one of the thermosetting elastomer and the elastically deformable resin material enables easy manufacture of the elastomer member, which is effective.

In the clutch unit according to the present invention, the lever-side clutch portion and the brake-side clutch portion are incorporated in an automobile seat-lifter section. Thus, the clutch unit is suited for use in an automobile. In this case, the clutch unit has a configuration in which the input-side member is connected to an operation lever and the output-side member is coupled to a link mechanism of the automobile seat-lifter section.

Advantageous Effects of Invention

According to the present invention, the inclined portion is formed into the shape for controlling the amount of axial movement of the elastic member when the elastic member is restored to the initial state through releasing of the torque input from the input-side member. Thus, at the time of lever operation of restoring a lever from a full stroke to a neutral position, it is possible to prevent the elastic member, which slides on the stationary-side member, from climbing onto the inclined portion of the stationary-side member, and to avoid contact of the elastic member with the input-side member. Accordingly, it is possible to prevent occurrence of noises.

Further, the elastic member comprises the C-shaped and band-like plate spring which comprises the pair of lock portions formed by bending both the ends thereof to the radially outer side, and one of the pair of lock portions and another of the pair of lock portions are formed at positions that are identical in the band-plate width direction. Thus, each end of the elastic member is formed into a symmetric shape, and hence it is possible to prevent such a moment force as to pivot the another of the pair of lock portions about a fulcrum set on the one of the pair of lock portions at the time of application of input torque. Accordingly, a behavior of the elastic member is stabilized, which can prevent occurrence of noises.

As a result, it is possible to provide a clutch unit with high reliability. In a case where the clutch unit is incorporated into the automobile seat-lifter section, lever operation of adjusting a seat vertically is performed satisfactorily, and hence comfortable lever operation can be realized for a passenger.

BRIEF DESCRIPTION OF DRAWINGS

FIG. 6bA left-hand side view of FIG. 6a.

FIG. 7aA sectional view illustrating an example of a lever-side outer ring.

FIG. 7bA left-hand side view of FIG. 7a.

FIG. 7cA right-hand side view of FIG. 7a.

FIG. 8bA left-hand side view of FIG. 8a.

FIG. 10aA sectional view of the retainer.

FIG. 10bA left-hand side view of FIG. 10a.

FIG. 10cA sectional view of FIG. 10a.

FIG. 13aA perspective view of an output shaft seen from one side.

FIG. 13bA perspective view of the output shaft seen from another side.

FIG. 14bA left-hand side view of FIG. 14a.

FIG. 14cA right-hand side view of FIG. 14a.

FIG. 15bA left-hand side view of FIG. 15a.

FIG. 16aA sectional view of a cover.

FIG. 16bA right-hand side view of FIG. 16a.

FIG. 17bA right-hand side view of FIG. 17a.

FIG. 18bA left-hand side view of FIG. 18a.

FIG. 18cA right-hand side view of FIG. 18a.

FIG. 19aA perspective view illustrating a state before the brake-side outer ring is assembled to the brake-side side plate.

FIG. 19bA perspective view illustrating a state after the brake-side outer ring is assembled to the brake-side side plate.

FIG. 39bAn enlarged main part view of FIG. 39a.

DESCRIPTION OF EMBODIMENTS

Figure 1:
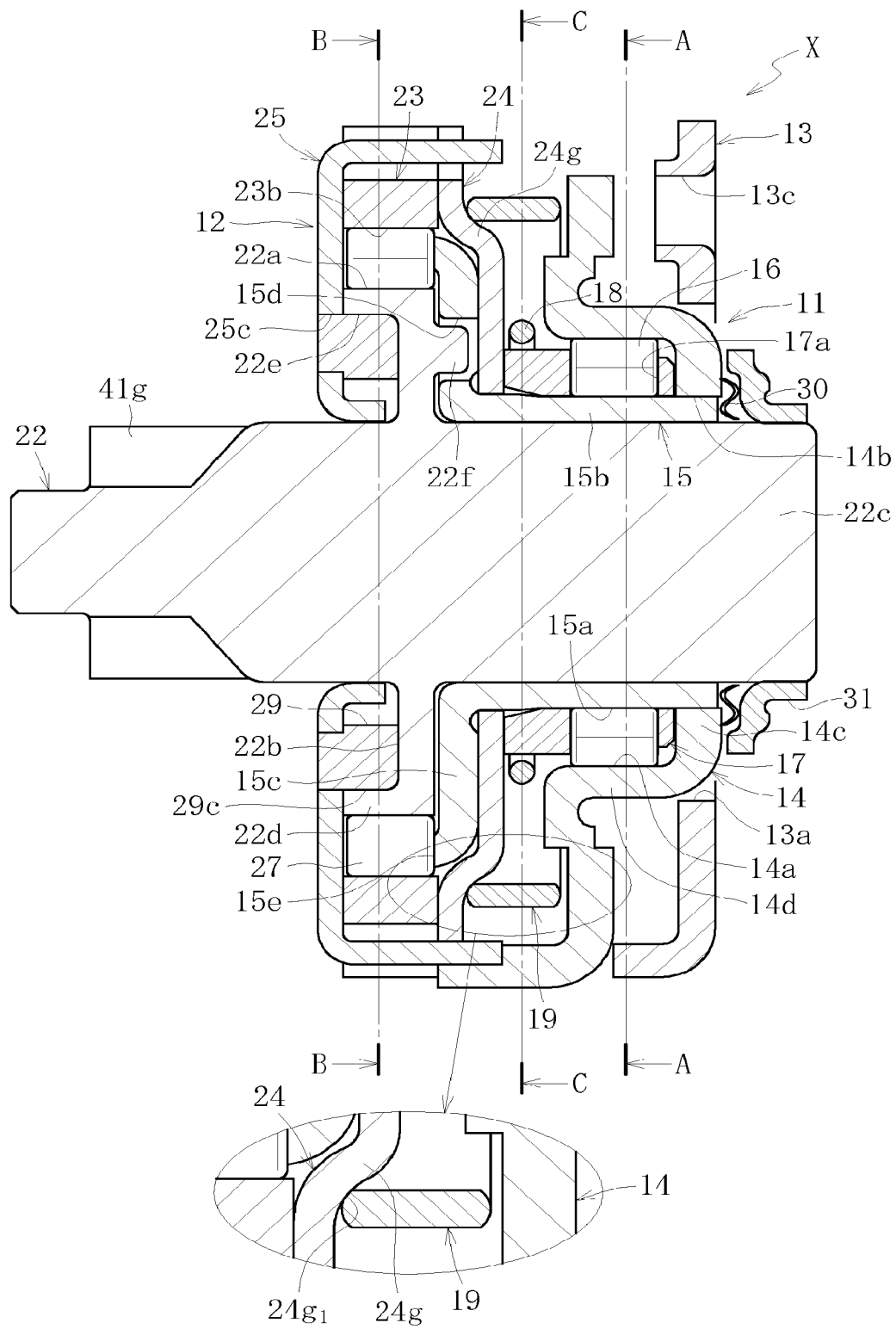
FIG. 1 A longitudinal sectional view of an overall structure of a clutch unit according to an embodiment of the present invention.
Figure 2:
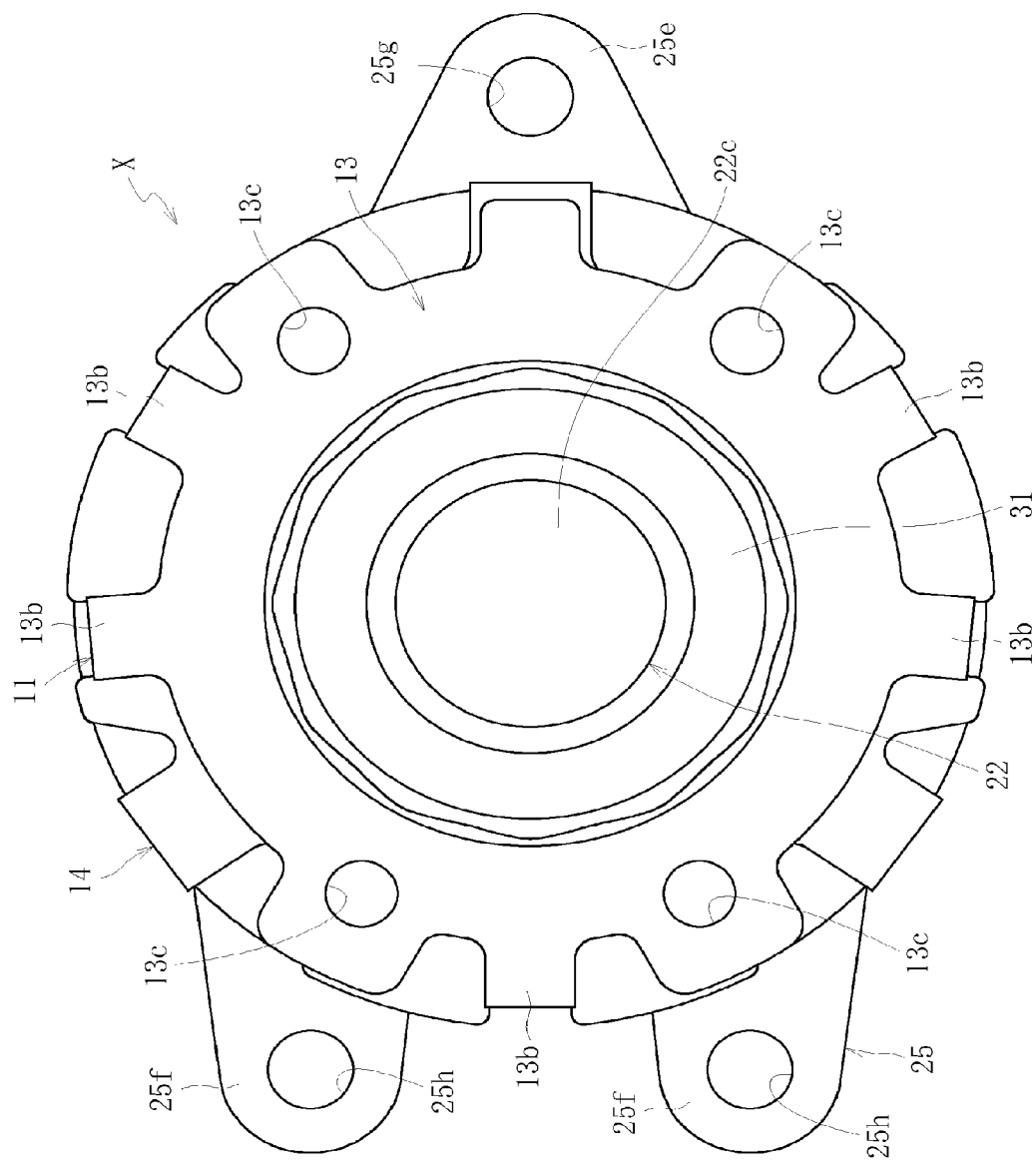
FIG. 2 A right-hand side view of FIG. 1.
Figure 3:
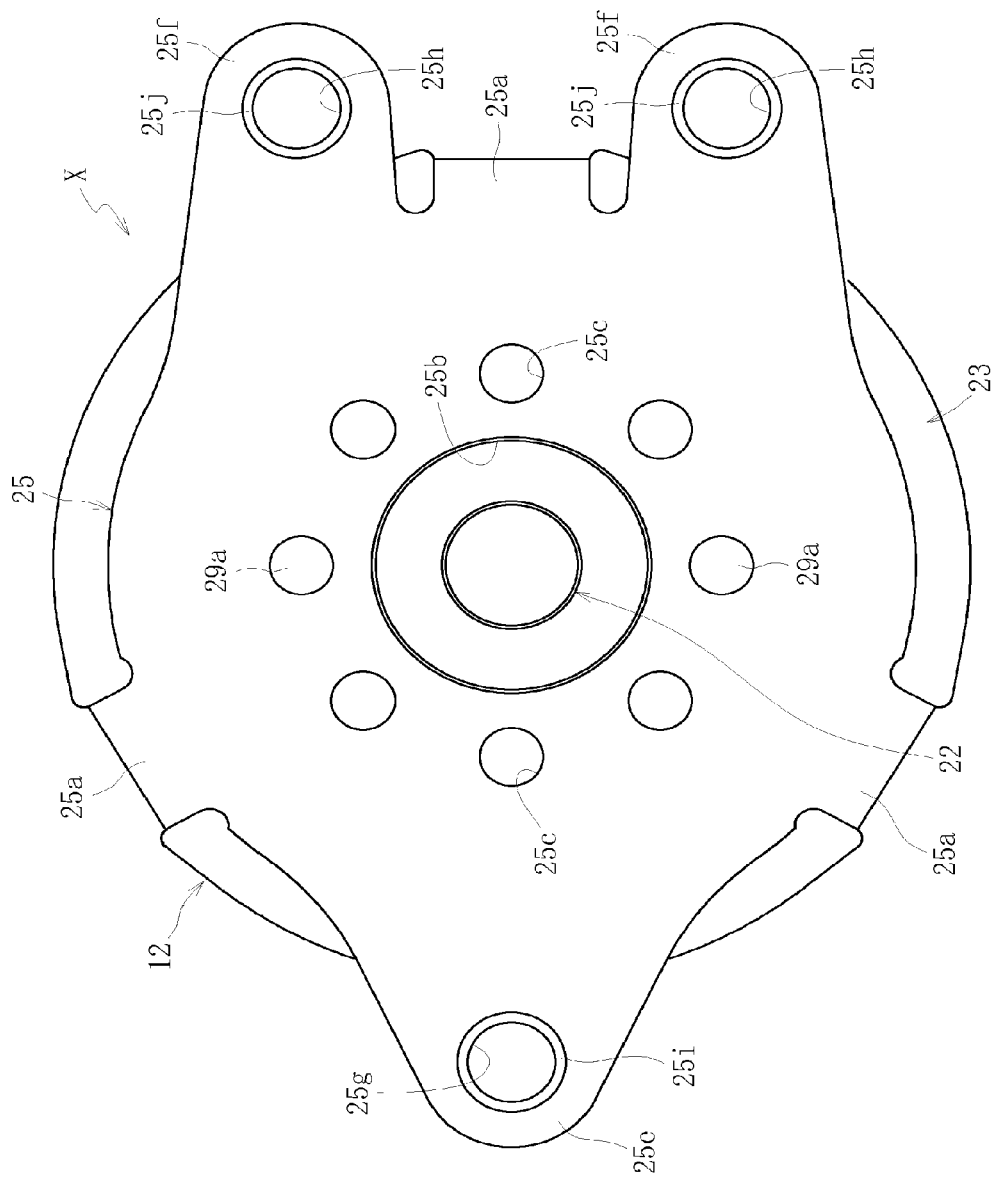
FIG. 3 A left-hand side view of FIG. 1.
Figure 4:
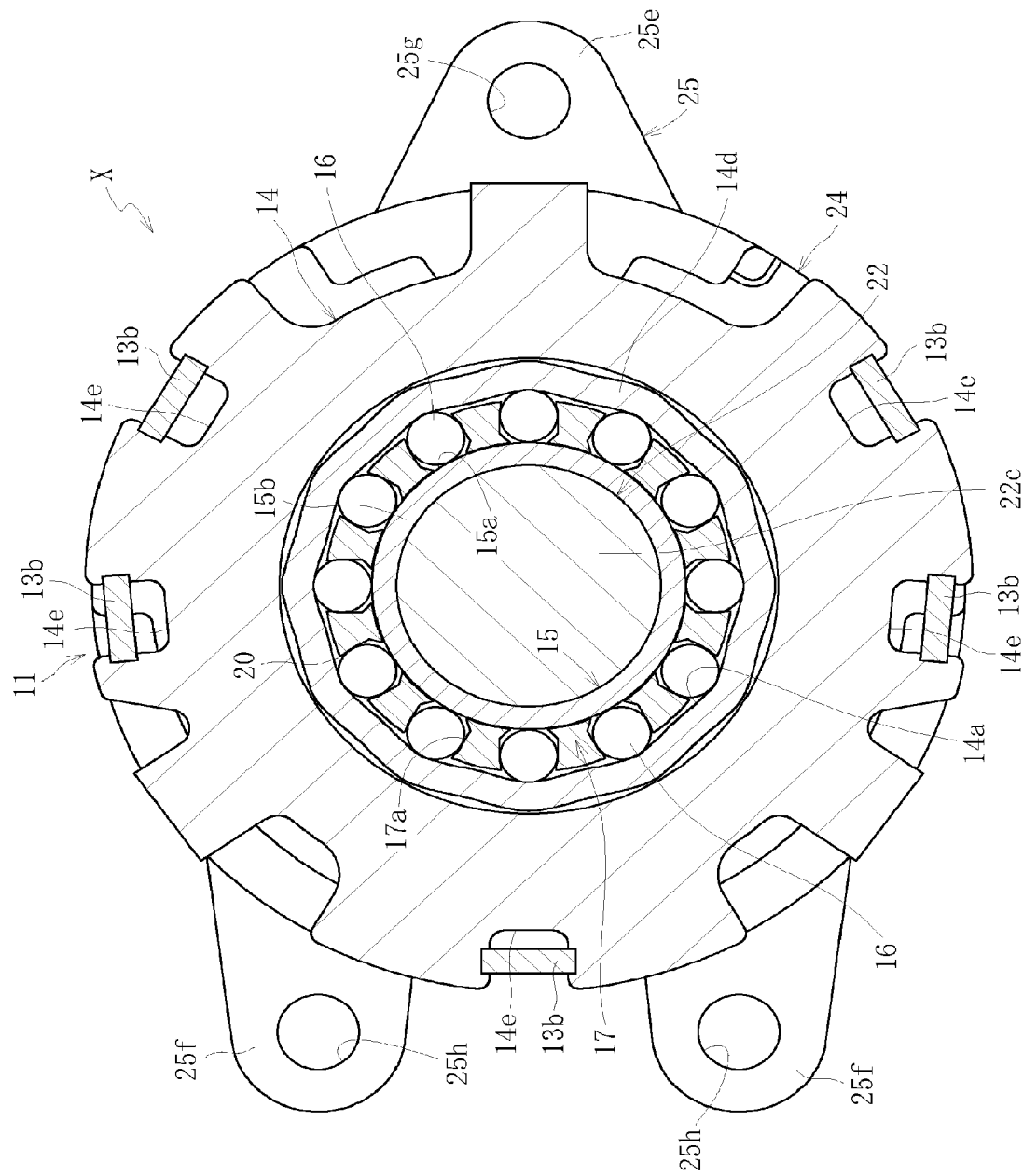
FIG. 4 A sectional view taken along the line A-A of FIG. 1.
Figure 5:
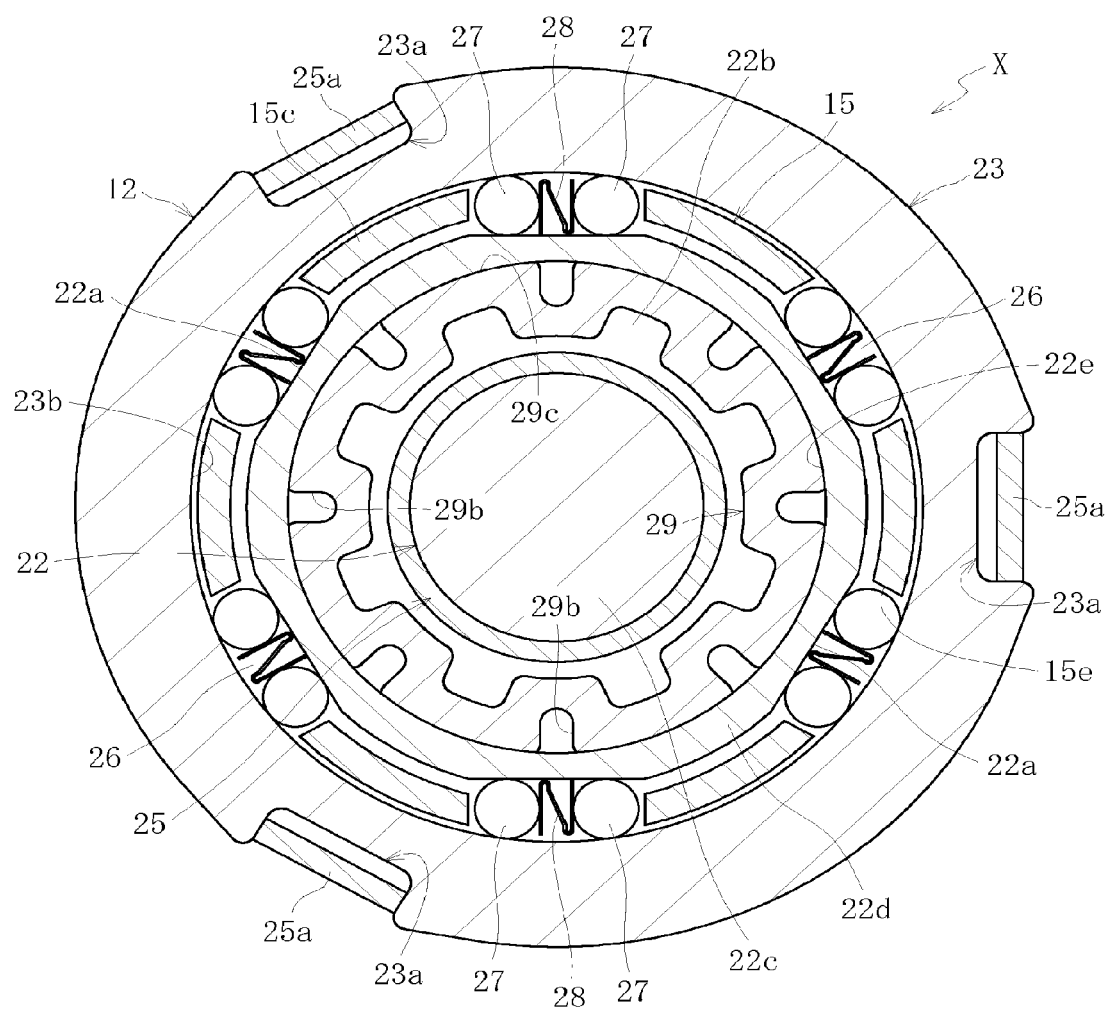
FIG. 5 A sectional view taken along the line B-B of FIG. 1.

FIG. 1 is a longitudinal sectional view of an overall structure of a clutch unit X according to an embodiment of the present invention. FIG. 2 is a right-hand side view of the clutch unit X illustrated in FIG. 1. FIG. 3 is a left-hand side view of the clutch unit X illustrated in FIG. 1. FIG. 4 is a lateral sectional view taken along the line A-A of FIG. 1. FIG. 5 is a lateral sectional view taken along the line B-B of FIG. 1. Further, FIGS. 6 to 18 illustrate main components of the clutch unit X. FIGS. 19 to 23 illustrate assembled states of the main components of the clutch unit X.

The clutch unit X is incorporated into an automobile seat-lifter section (see FIGS. 38, 39a, and 39b) for adjusting a height of a seat through lever operation or the like. As illustrated in FIGS. 1 to 5, the clutch unit X comprises a unit of a lever-side clutch portion 11 provided on an input side and a brake-side clutch portion 12 which is provided on an output side and which has a function of interrupting reverse input.

As illustrated in FIGS. 1, 2, and 4, the lever-side clutch portion 11 comprises a lever-side side plate 13 and a lever-side outer ring 14 each serving as an input-side member to which an operation lever (not shown) or the like is connected, an inner ring 15 serving as a coupling member which transmits torque from the lever-side outer ring 14 to the brake-side clutch portion 12, a plurality of cylindrical rollers 16 arranged as an example of engagement elements in wedge gaps 20 formed between an outer peripheral surface 15a of the inner ring 15 and an inner peripheral surface 14a of the lever-side outer ring 14, a retainer 17 for retaining the cylindrical rollers 16 equiangularly, an inner centering spring 18 as a first elastic member for restoring the retainer 17 to a neutral state, and an outer centering spring 19 as a second elastic member for restoring the lever-side outer ring 14 to a neutral state. Note that, components are prevented from being detached by press-fitting a washer 31 onto an end portion of an output shaft 22 described later through intermediation of a wave washer 30 (see FIG. 1).

As illustrated in FIGS. 1, 3, and 5, the so-called lock type brake-side clutch portion 12 which has a function of interrupting reverse input mainly comprises the inner ring 15 serving as a coupling member to which the torque from the lever-side clutch portion 11 is input, the output shaft 22 serving as an output-side member, a brake-side outer ring 23, a cover 24, and a brake-side side plate 25 each serving as a stationary-side member restricted in rotation, a plurality of pairs of cylindrical rollers 27 arranged as engagement elements in wedge gaps 26 between the brake-side outer ring 23 and the output shaft 22, for controlling transmission of the torque input from the inner ring 15 and interruption of the torque reversely input from the output shaft 22 through engagement and disengagement between both the members, and plate springs 28 of, for example, an N-shaped sectional configuration, each inserted between the cylindrical rollers 27 of each pair and serving as elastic members for imparting repulsive force to the cylindrical rollers 27. Note that, protrusions 22f are provided to the output shaft 22 and inserted into holes 15d with clearances, which are provided to the inner ring 15 (see FIG. 1).

Next, detailed description is made of main components of the lever-side clutch portion 11 and the brake-side clutch portion 12 which are provided in the clutch unit X.

Figure 6A:
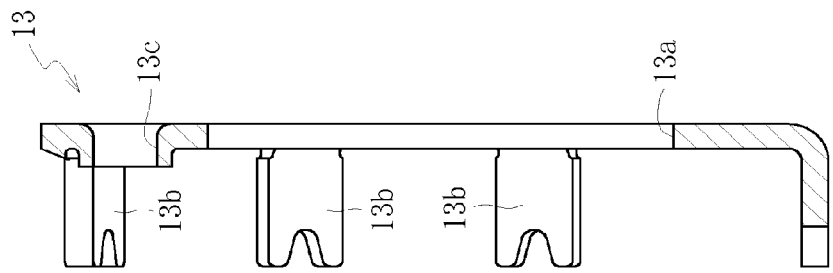
FIG. 6aA sectional view of a lever-side side plate.
Figure 6B:
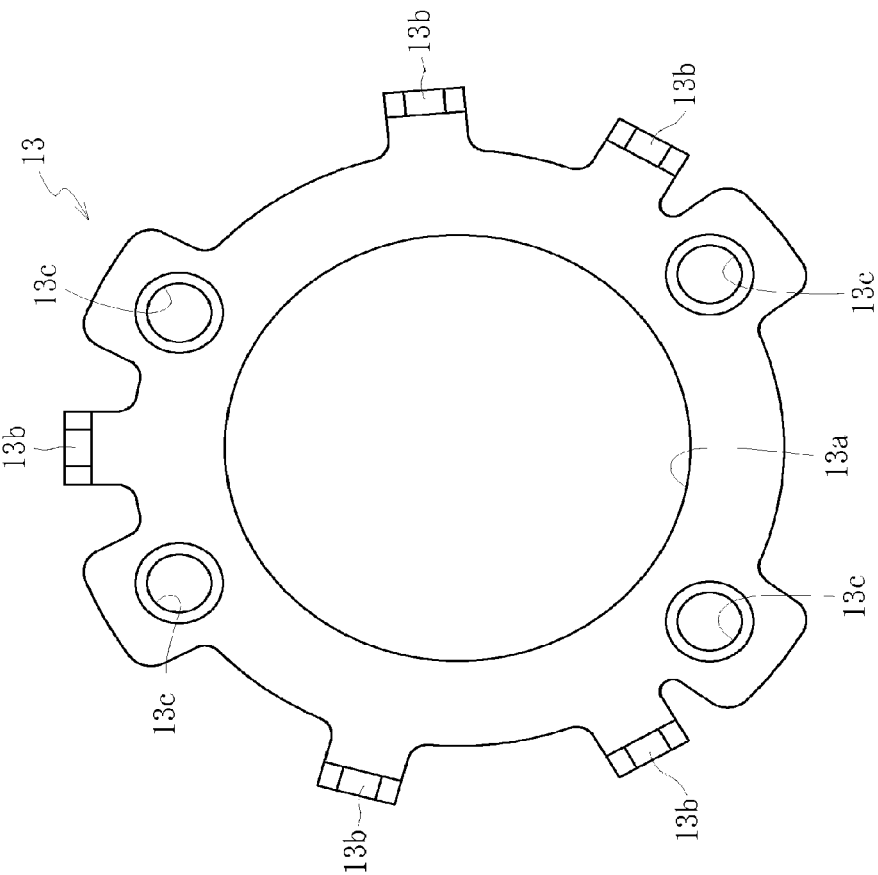

FIGS. 6a and 6b illustrate the lever-side side plate 13 of the lever-side clutch portion 11. In the lever-side side plate 13, a hole 13a into which the output shaft 22 and the inner ring 15 are inserted is formed in a center portion thereof, and a plurality of (five, for example) claw portions 13b are provided in a protruding manner on an outer peripheral portion thereof. Those claw portions 13b are bent and molded in an axial direction so as to have bisected distal ends. Then, the claw portions 13b are inserted into cutout recessed portions 14e (see FIG. 7c) of the lever-side outer ring 14, which are described later. Lastly, the distance between each of the bisected distal ends is increased outward. In this manner, the lever-side side plate 13 is fixed to the lever-side outer ring 14 by swaging. Note that, in the figures, a plurality of (four, for example) holes for mounting the operation lever (not shown) for adjusting a height of a seat to the lever-side side plate 13 are represented by reference symbol 13c.

FIGS. 7a to 7c illustrate the lever-side outer ring 14. The lever-side outer ring 14 is obtained by molding a plate-like material into a cup-shape through press working, and comprises a hole 14b formed in a center portion 14c, through which the output shaft 22 and the inner ring 15 are inserted. On an inner periphery of a cylindrical portion 14d extending from the center portion 14c in the axial direction, a plurality of cam surfaces 14a are equiangularly formed (see FIG. 4).

On an outer peripheral portion of the lever-side outer ring 14, a plurality of (three, for example) claw portions 14f and 14g are provided in a protruding manner and bent and molded in the axial direction. Of those claw portions 14f and 14g, the one claw portion 14f is locked by being inserted and arranged between two lock portions 19a (see FIGS. 12a and 12b) of the outer centering spring 19 described later. In a state of being in contact with an end surface of the brake-side outer ring 23 described later, the other two claw portions 14g slide on the end surface of the brake-side outer ring 23 in accordance with rotation of the lever-side outer ring 14, and move between a pair of lock portions 24e and 24f (see FIG. 16b) as rotation stoppers provided on an outer periphery of the cover 24 so as to be abuttable on the lock portion 24e and 24f, respectively, at moving ends in a rotational direction. In this manner, an operating angle of the operation lever is restricted.

The plurality of (five in the figure) cutout recessed portions 14e into which the claw portions 13b (see FIGS. 6a and 6b) of the lever-side side plate 13 are inserted are formed on an outer periphery of the lever-side outer ring 14. By swaging the claw portions 13b of the lever-side side plate 13, which are inserted into the cutout recessed portions 14e, the lever-side side plate 13 and the lever-side outer ring 14 are connected to each other. The lever-side outer ring 14 and the lever-side side plate 13 fixed by swaging to the lever-side outer ring 14 constitute the input-side member of the lever-side clutch portion 11.

Figure 8B:
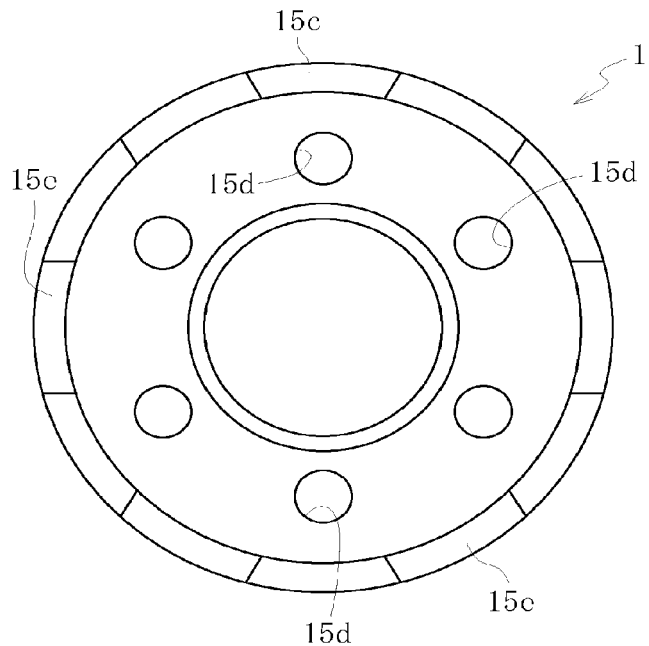
Figure 8A:
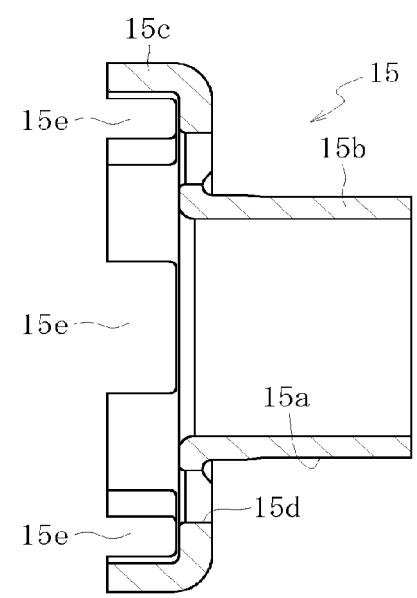
FIG. 8aA sectional view of an inner ring.
Figure 9:
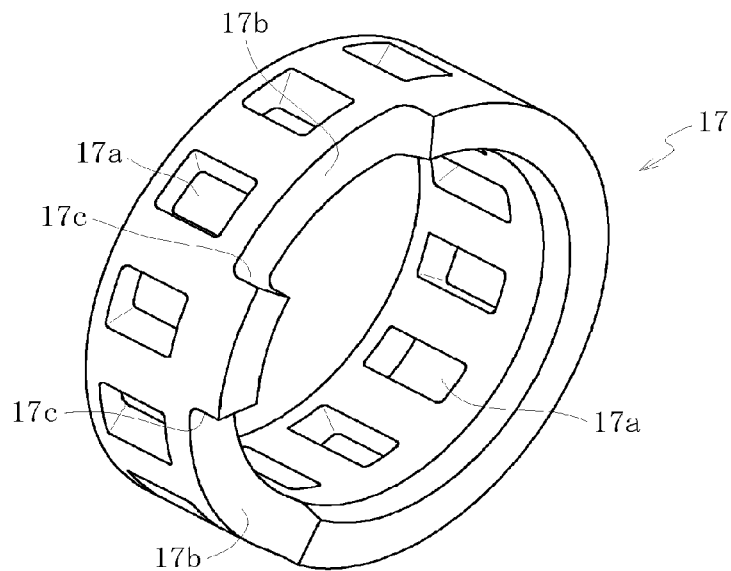
FIG. 9 A perspective view of a retainer.

FIGS. 8a and 8b illustrate the inner ring 15. The inner ring 15 is provided with the outer peripheral surface 15a formed on an outer diameter of a cylindrical portion 15b into which the output shaft 22 is inserted, the wedge gaps 20 (see FIG. 4) being formed between the outer peripheral surface 15a and the cam surfaces 14a of the lever-side outer ring 14. Further, a larger diameter portion 15c extending from an end portion of the cylindrical portion 15b in a radially outer direction and bending in the axial direction is integrally formed. In order to cause the larger diameter portion 15c to function as a retainer for the brake-side clutch portion 12, pockets 15e for accommodating the cylindrical rollers 27 and the plate springs 28 are equiangularly formed in the larger diameter portion 15c. Note that, in the figures, holes into which the protrusions 22f of the output shaft 22 (see FIG. 1) are inserted with clearances are represented by a reference symbol 15d.

FIGS. 9, and 10a to 10c illustrate the retainer 17 made of a resin. The retainer 17 is a cylindrical member in which a plurality of pockets 17a for accommodating the cylindrical rollers 16 are equiangularly formed. Two cutout recessed portions 17b are formed in one end portion of the retainer 17, and lock portions 18a of the above-mentioned inner centering spring 18 are locked to two adjacent end surfaces 17c of the respective cutout recessed portions 17b (see FIG. 22).

Figure 11:
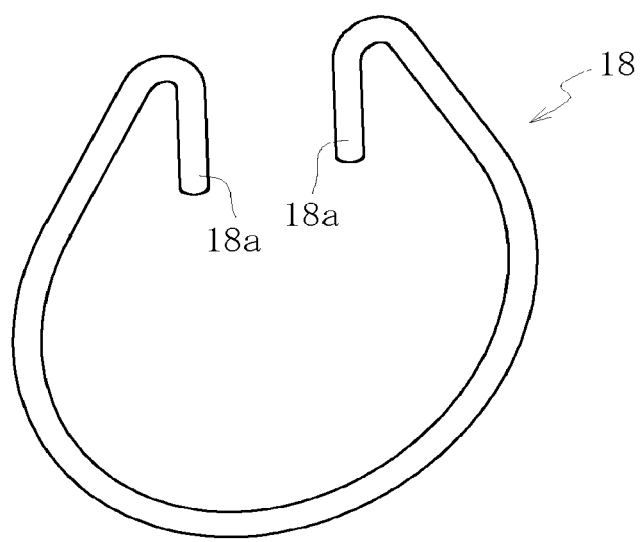
FIG. 11 A perspective view of an inner centering spring.

FIG. 11 illustrates the inner centering spring 18. The inner centering spring 18 is a spring having a circular C-shape in cross-section and comprising a pair of the lock portions 18a bent to a radially inner side, and is situated on the radially inner side of the outer centering spring 19 (see FIG. 22). The inner centering spring 18 is arranged between the retainer 17 and the cover 24 serving as a stationary-side member of the brake-side clutch portion 12. In addition, both the lock portions 18a are locked to the two end surfaces 17c (see FIGS. 9 and 10b) of the retainer 17 and locked to a claw portion 24b (see FIGS. 16a and 16b) provided to the cover 24 (see FIGS. 22, 23a and 23b).

At the time of application of torque input from the lever-side outer ring 14 in the inner centering spring 18, one of the lock portions 18a is engaged with one of the end surfaces 17c of the retainer 17, and the other of the lock portions 18a is engaged with the claw portion 24b of the cover 24. Thus, the inner centering spring 18 is pressed and extended in accordance with rotation of the lever-side outer ring 14 so as to accumulate an elastic force. At the time of releasing the torque input from the lever-side outer ring 14, the retainer 17 is restored to a neutral state with the elastic restoring force.

Figure 12A:
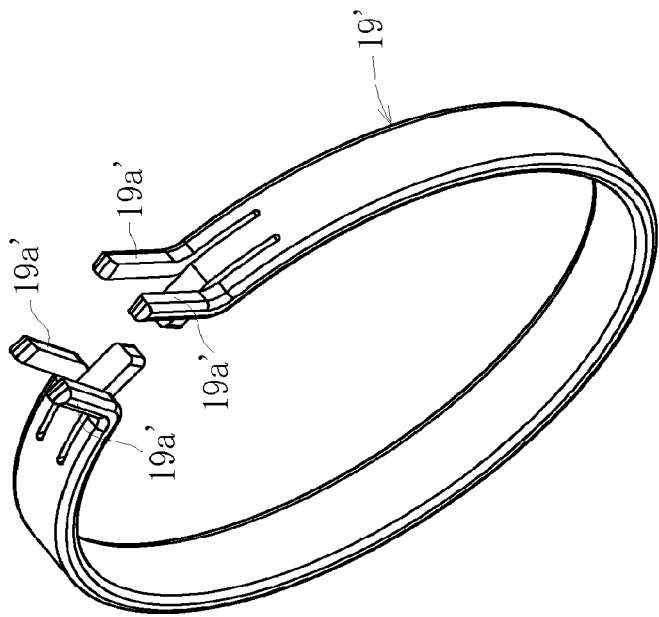
FIG. 12aA perspective view illustrating an example of an outer centering spring.

FIG. 12a illustrates an example of the outer centering spring 19. The outer centering spring 19 is a C-shaped and band plate-like spring comprising the pair of lock portions 19a formed by bending both the ends thereof to a radially outer side, and is situated on a radially outer side of the inner centering spring 18 (see FIG. 22). The outer centering spring 19 is arranged between the lever-side outer ring 14 of the lever-side clutch portion 11 and the cover 24 of the brake-side clutch portion 12. Both the lock portions 19a are locked to the claw portion 14f (see FIGS. 7a to 7c) provided to the lever-side outer ring 14, and also locked to a claw portion 24d (see FIGS. 16a and 16b) provided to the cover 24 (see FIGS. 23a and 23b). The lock portions 19a are arranged while being displaced (by 180°) in a circumferential direction with respect to the lock portions 18a of the inner centering spring 18 (see FIG. 22).

In the outer centering spring 19, when the torque input from the lever-side side plate 13 is applied through lever operation so as to rotate the lever-side outer ring 14, one of the lock portions 19a is engaged with the claw portion 14f of the lever-side outer ring 14, and the other of the lock portions 19a is engaged with the claw portion 24d of the cover 24, respectively. Thus, the outer centering spring 19 is pressed and extended in accordance with the rotation of the lever-side outer ring 14 so as to accumulate an elastic force. After the outer center spring 19 is increased in diameter, when the torque input from the lever-side outer ring 14 is released, the lever-side outer ring 14 is restored to a neutral state with the elastic restoring force.

Figure 43:
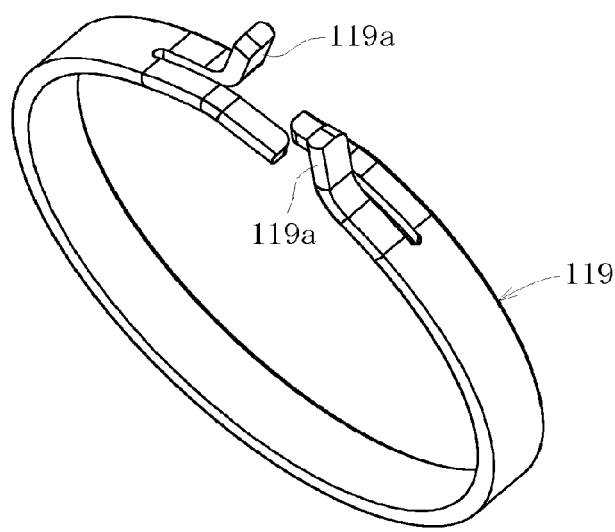
FIG. 43 A perspective view illustrating an outer centering spring of the conventional clutch unit.

Unlike in the conventional outer centering spring 119 (see FIG. 43), in the outer centering spring 19 illustrated in FIG. 12a, one of the lock portions 19a and the other of the lock portions 19a are formed at center positions that are identical in a band-plate width direction. That is, one of the lock portions 19a and the other of the lock portions 19a are formed in such a manner that two slits are formed in each end of the outer centering spring 19 in a peripheral direction and a center part situated between the two slits is bent to a radially outer side. Thus, each end of the outer centering spring 19 is shaped to be symmetric with respect to a center line in a band-plate peripheral direction, and hence it is possible to prevent a moment force generated at the time of application of input torque, i.e., such a force as to pivot the other of the lock portions 19a about a fulerum set on one of the lock portions 19a. Accordingly, a behavior of the outer centering spring 19 is stabilized, which can prevent occurrence of noises.

Figure 12B:
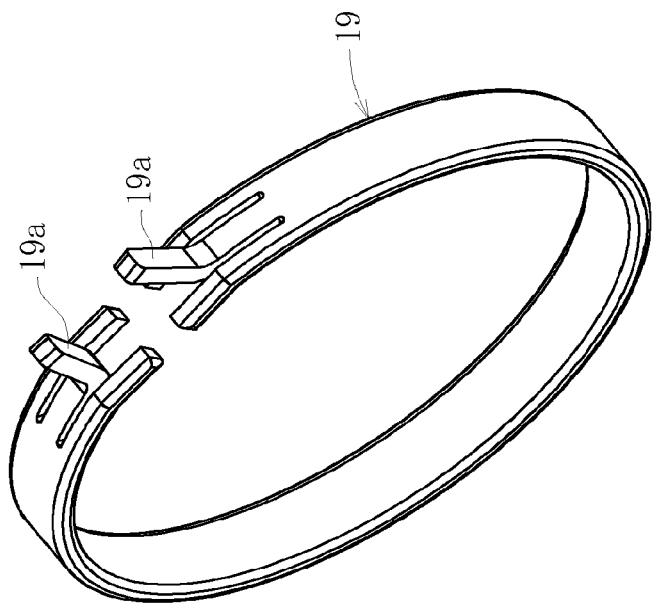
FIG. 12bA perspective view illustrating another example of the outer centering spring.

Note that, it is only necessary that each end of the outer centering spring 19 be shaped to be symmetric with respect to the center line in the band-plate peripheral direction, and hence, for example, an outer centering spring 19' as illustrated in FIG. 12b may be employed. The outer centering spring 19' is a C-shaped and band-like plate spring which comprises a pair of lock portions 19a' formed by bending each end thereof to the radially outer side. One of the lock portions 19a' and the other of the lock portions 19a' are formed at both side positions that are identical in the band-plate width direction. That is, one of the lock portions 19a' and the other of the lock portions 19a' are formed in such a manner that two slits are formed in each end of the outer centering spring 19' in the peripheral direction and both side parts situated on the outer side of the two slits are bent to the radially outer side. Also in this case, it is possible to prevent a moment force generated at the time of application of input torque, i.e., such a force as to pivot the other of the lock portions 19a' about a fulerum set on one of the lock portions 19a'. Accordingly, a behavior of the outer centering spring 19' is stabilized, which can prevent occurrence of noises.

FIGS. 13a and 13b and FIGS. 14a to 14c illustrate the output shaft 22. The output shaft 22 comprises a larger diameter portion 22d which extends from a shaft portion 22c to the radially outer side to be increased in diameter, and is integrally formed substantially in an axial center region of the output shaft 22. A pinion gear 41g to be coupled to a seat-lifter section 41 is coaxially formed on a distal end of the shaft portion 22c.

A plurality of (six, for example) flat cam surfaces 22a are equiangularly formed on an outer peripheral surface of the larger diameter portion 22d, and the two cylindrical rollers 27 and the plate spring 28 are arranged in each wedge gap 26 (see FIG. 5) provided between the cam surfaces 22a and an inner peripheral surface 23b of the brake-side outer ring 23. In one end surface of the larger diameter portion 22d, there is formed an annular recessed portion 22b in which a friction ring 29 is accommodated and arranged. Further, in the figures, protrusions formed on the other end surface of the larger diameter portion 22d are represented by reference symbol 22f, the protrusions being inserted into the holes 15d of the inner ring 15 with clearances (see FIGS. 1, 8a, and 8b).

Figure 15B:
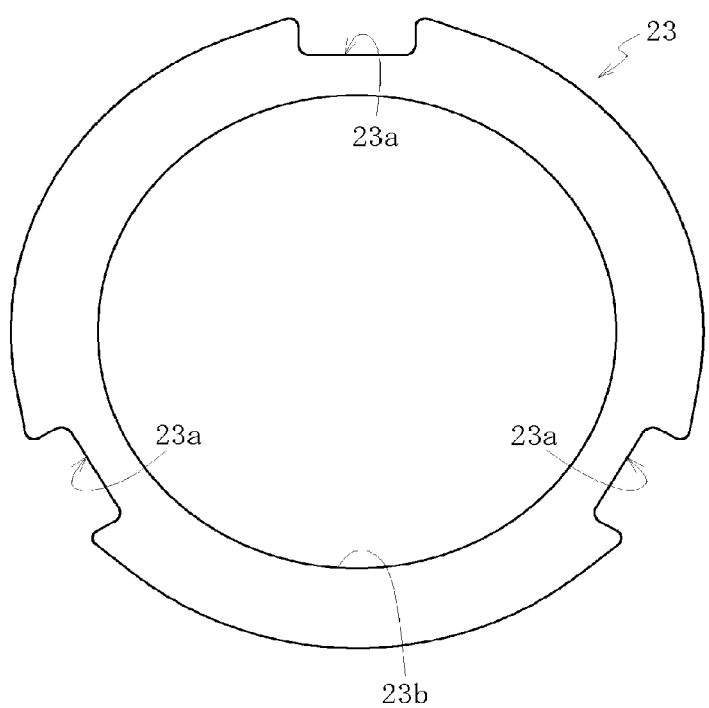
Figure 15A:
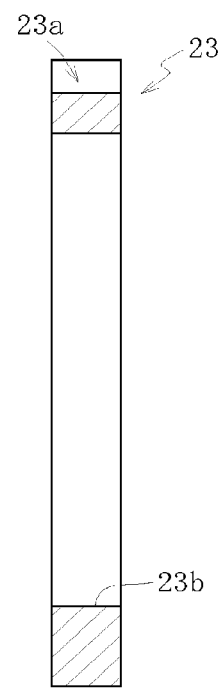
FIG. 15aA sectional view of a brake-side outer ring.
Figure 17A:
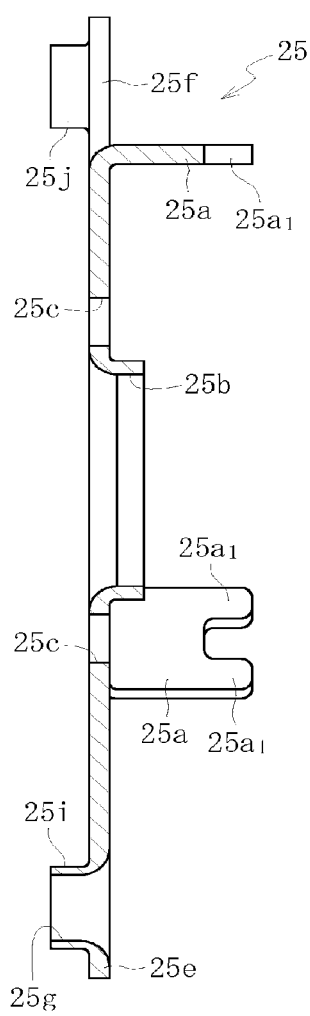
FIG. 17aA sectional view of a brake-side side plate.
Figure 17B:
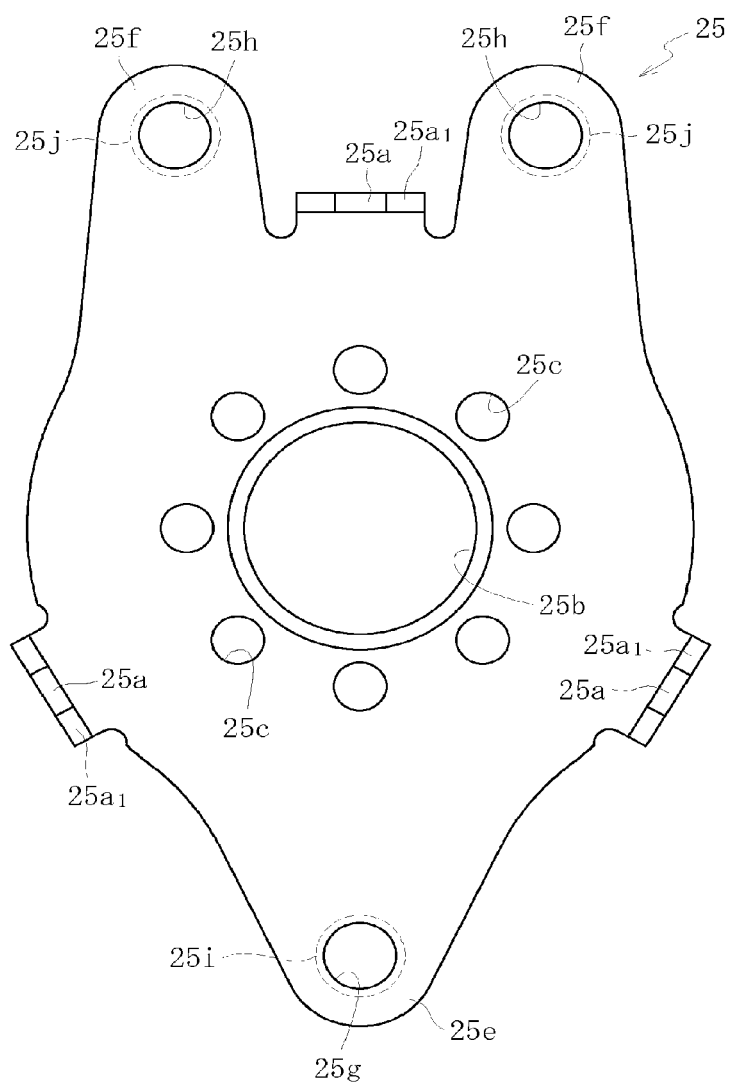

FIGS. 15a and 15b illustrate the brake-side outer ring 23, and FIGS. 16a and 16b illustrate the cover 24. FIGS. 17a and 17b illustrate the brake-side side plate 25. The brake-side outer ring 23 and the cover 24 described above are integrally fixed to each other with the brake-side side plate 25 by swaging. The brake-side outer ring 23 is formed of a thick plate-like member obtained by punching of a single material with a press, and the cover 24 is molded by pressing of another single material. As illustrated in FIGS. 16a and 16b, the cover 24 has an inclined portion 24g, which swells to the outer centering spring 19 side in a state of abutting on the larger diameter portion 15c of the inner ring 15 described above (see FIG. 1). Note that, in the figures, holes into which the output shaft 22 is inserted are represented by reference symbols 24c and 25b, and holes to which protrusions 29a of the friction ring 29 described later are fitted are represented by reference symbol 25c.

The clutch unit X has the following structure. Specifically, the outer centering spring 19 is arranged between the cover 24 and the lever-side outer ring 14, and the outer centering spring 19 abuts on the cover 24 on the radially outer side of the inclined portion 24g of the cover 24. Here, at the time of lever operation of restoring a lever from a full stroke to a neutral position, the outer centering spring 19, which slides on the cover 24, climbs onto the inclined portion 24g of the cover 24 and thus comes into contact with the opposing lever-side outer ring 14. As a result, slight noises may occur. Accordingly, the inclined portion 24g of the cover 24 is formed into a shape for controlling an amount of axial movement of the outer centering spring 19 when the outer centering spring 19 is restored to an initial state by releasing of input torque.

Figure 40:
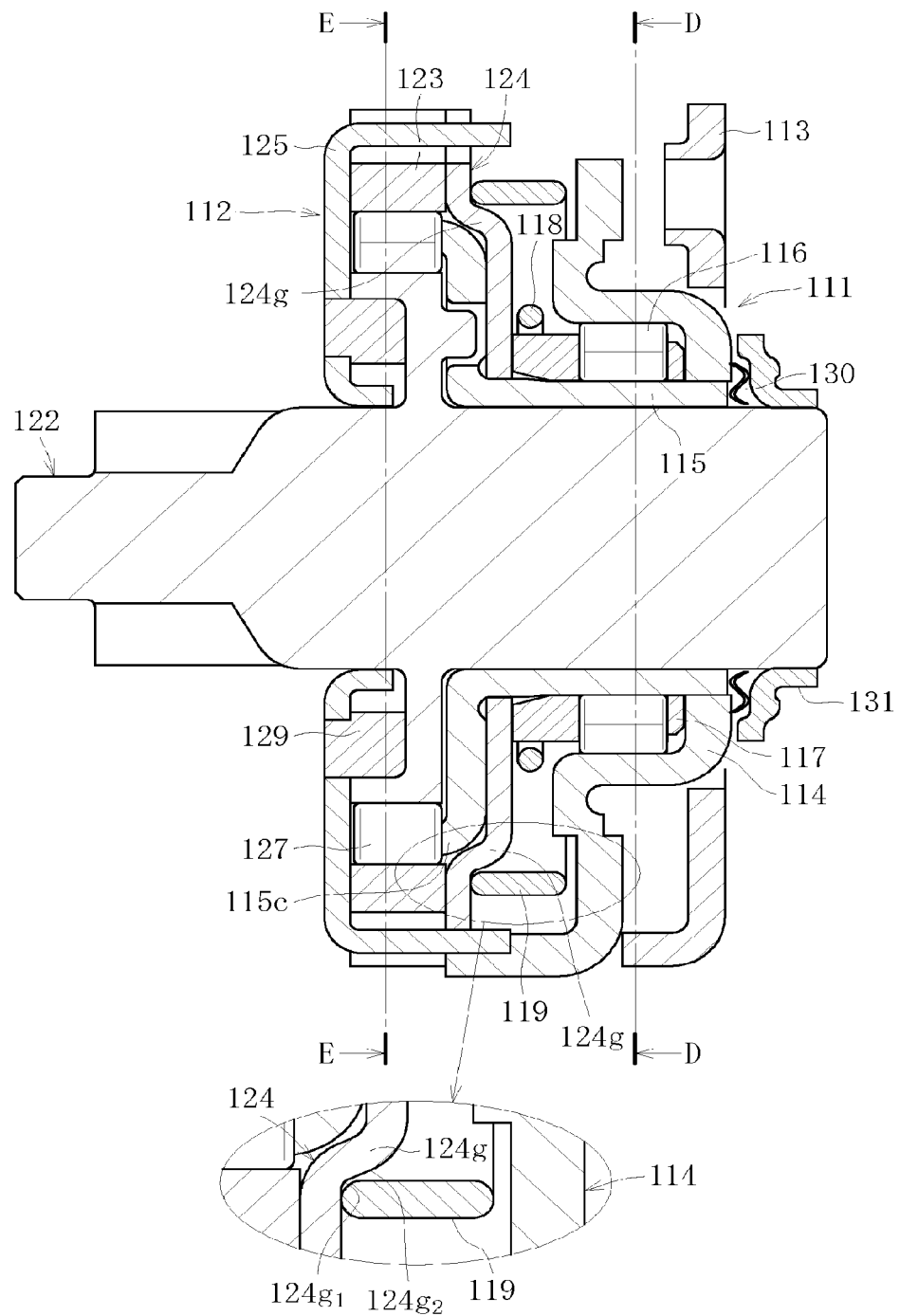
FIG. 40 A longitudinal sectional view illustrating an overall structure of a conventional clutch unit.
Figure 41:
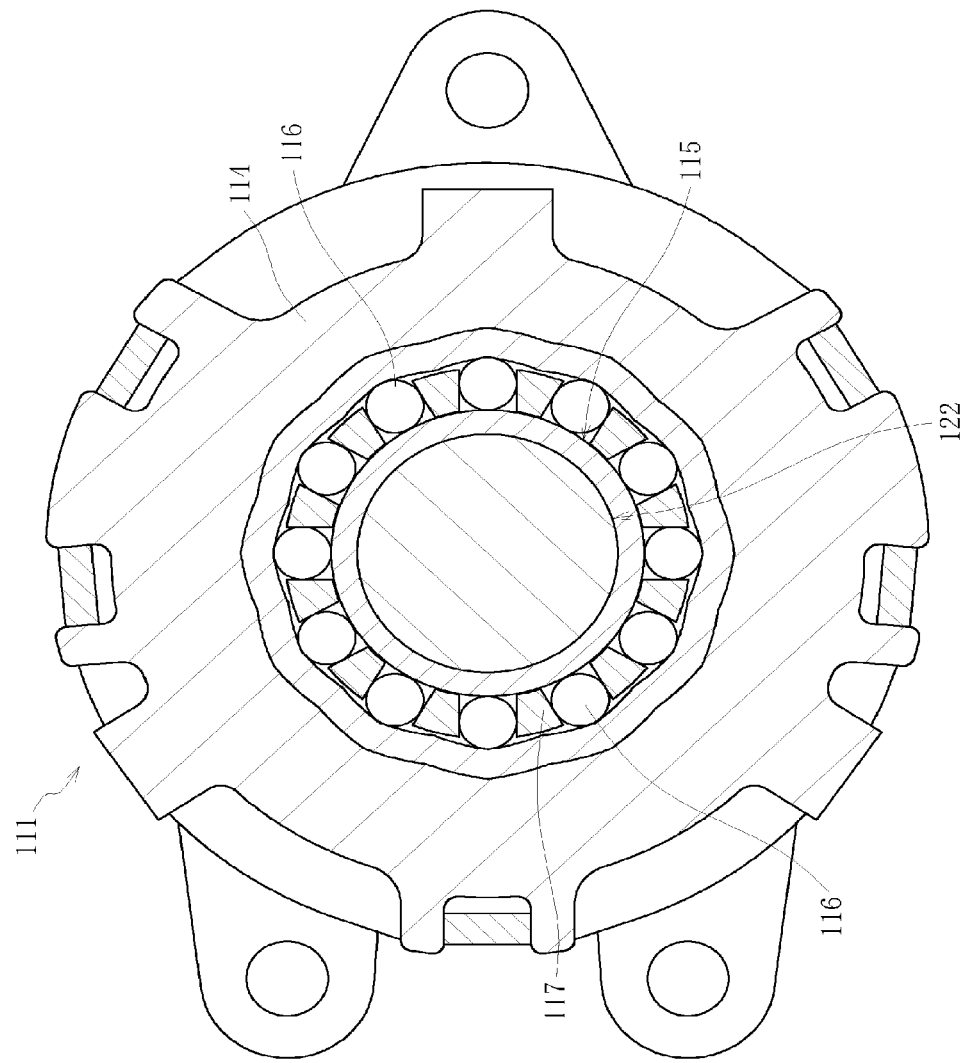
FIG. 41 A lateral sectional view taken along the line D-D of FIG. 40.
Figure 42:
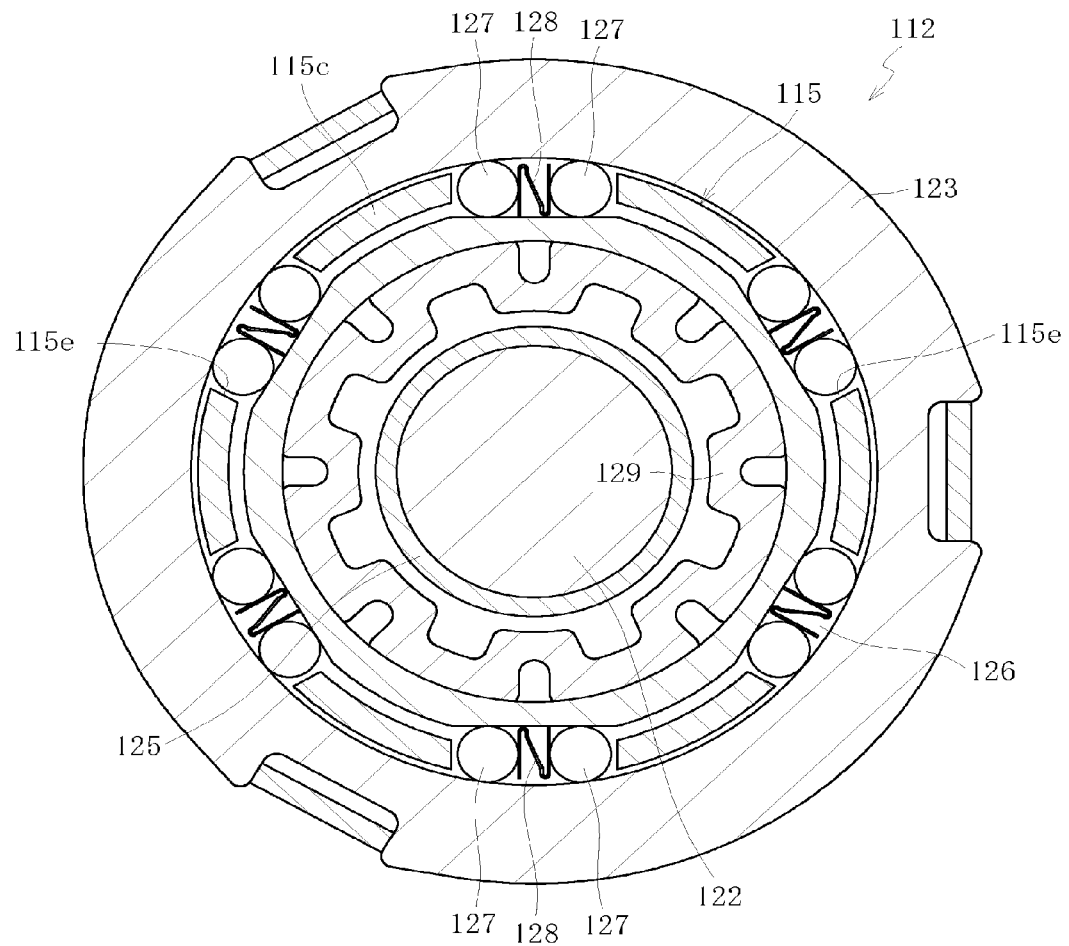
FIG. 42 A lateral sectional view taken along the line E-E of FIG. 40.

That is, according to the embodiment illustrated in FIG. 1, a curvature radius of a rounded corner surface $24g_1$ situated at an outermost diameter of the inclined portion 24g of the cover 24 is set larger than a curvature radius of a rounded corner surface $124g_1$ situated at an outermost diameter of the inclined portion 124g of the conventional cover 124 (see FIG. 40). Thus, a swelling height of the inclined portion 24g is changed gradually with respect to a radial change of the outer centering spring 19 when the outer centering spring 19 climbs onto the inclined portion 24g of the cover 24 at the time of lever operation of restoring the lever from a full stroke to a neutral position, and thus the amount of axial movement of the outer centering spring 19 can be controlled. As a result, it is possible to prevent the outer centering spring 19 from climbing onto the inclined portion 24g of the cover 24, and to avoid contact of the outer centering spring 19 with the lever-side outer ring 14. Therefore, it is possible to prevent occurrence of noises.

Figure 24:
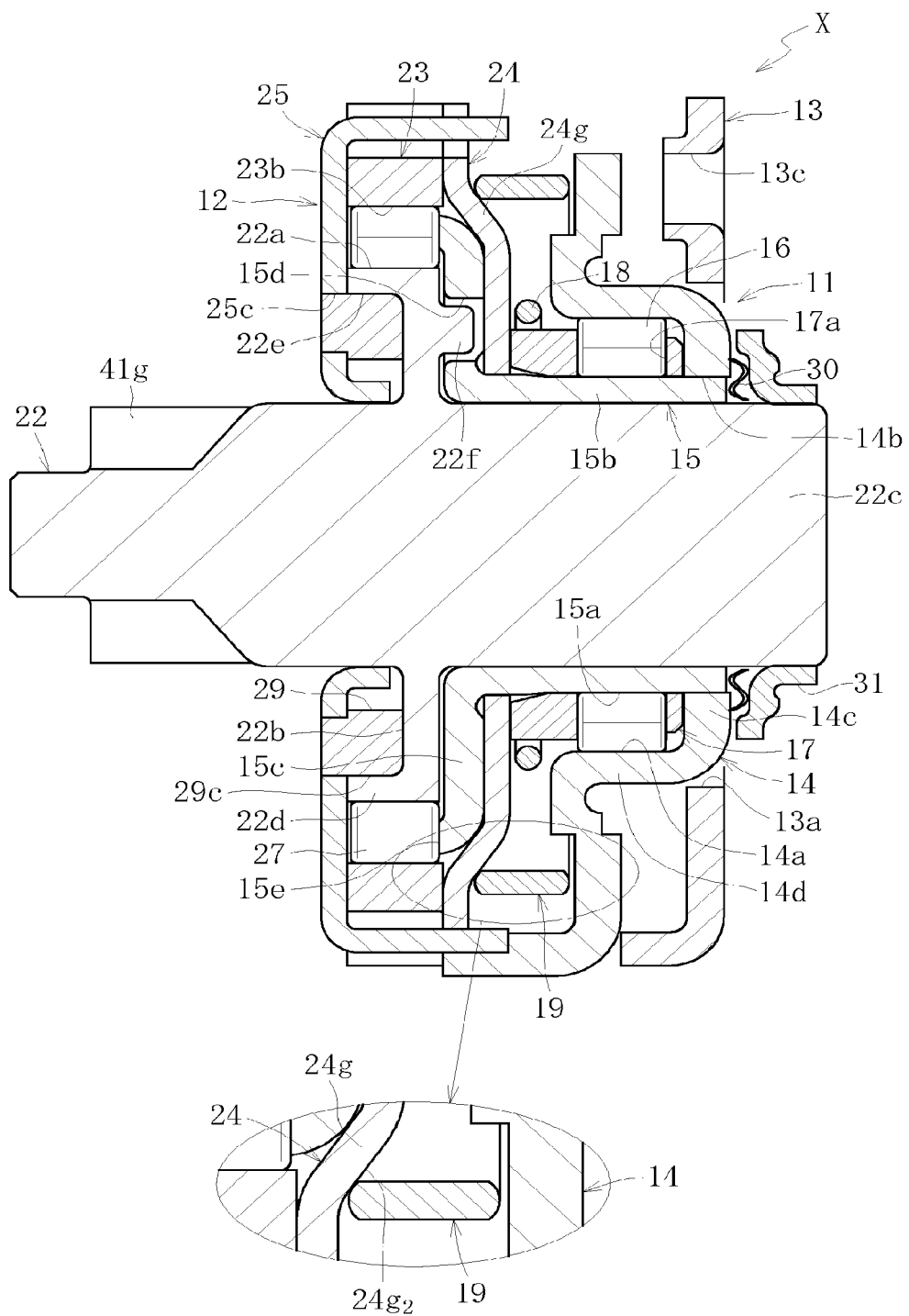
FIG. 24 A longitudinal sectional view illustrating an overall structure of a clutch unit according to another embodiment of the present invention.

Further, as another embodiment, as illustrated in FIG. 24, an angle of an inclined surface $24g_2$ extending radially inward from the outermost diameter of the inclined portion 24g of the cover 24 may be set smaller than an angle of an inclined surface $124g_2$ extending radially inward from the outermost diameter of the inclined portion 124g of the conventional cover 124 (see FIG. 40). Thus, the swelling height of the inclined portion 24g is changed gradually with respect to the radial change of the outer centering spring 19 when the outer centering spring 19 climbs onto the inclined portion 24g of the cover 24 at the time of lever operation of restoring the lever from a full stroke to a neutral position, and thus the amount of axial movement of the outer centering spring 19 can be controlled. As a result, it is possible to prevent the outer centering spring 19 from climbing onto the inclined portion 24g of the cover 24, and to avoid contact of the outer centering spring 19 with the lever-side outer ring 14. Therefore, it is possible to prevent occurrence of noises.

Figure 20:
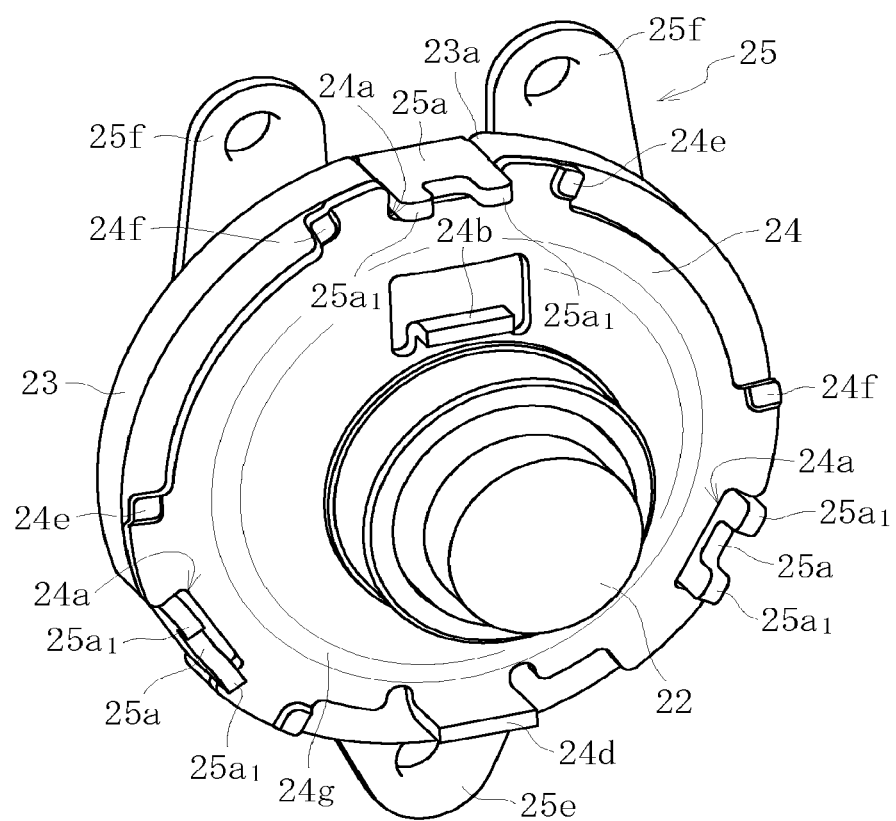
FIG. 20 A perspective view illustrating a state in which the brake-side outer ring and the cover are assembled to the brake-side side plate.
Figure 21:
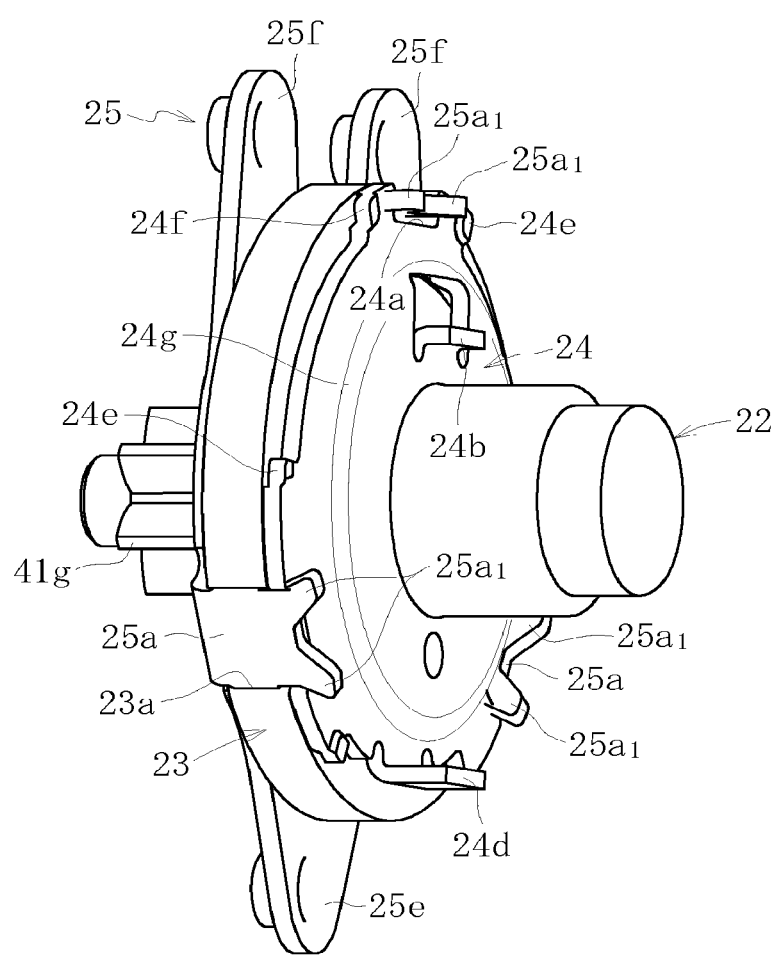
FIG. 21 A perspective view illustrating a state in which the brake-side side plate, the brake-side outer ring, and the cover are integrated with one another by swaging.
Figure 22:
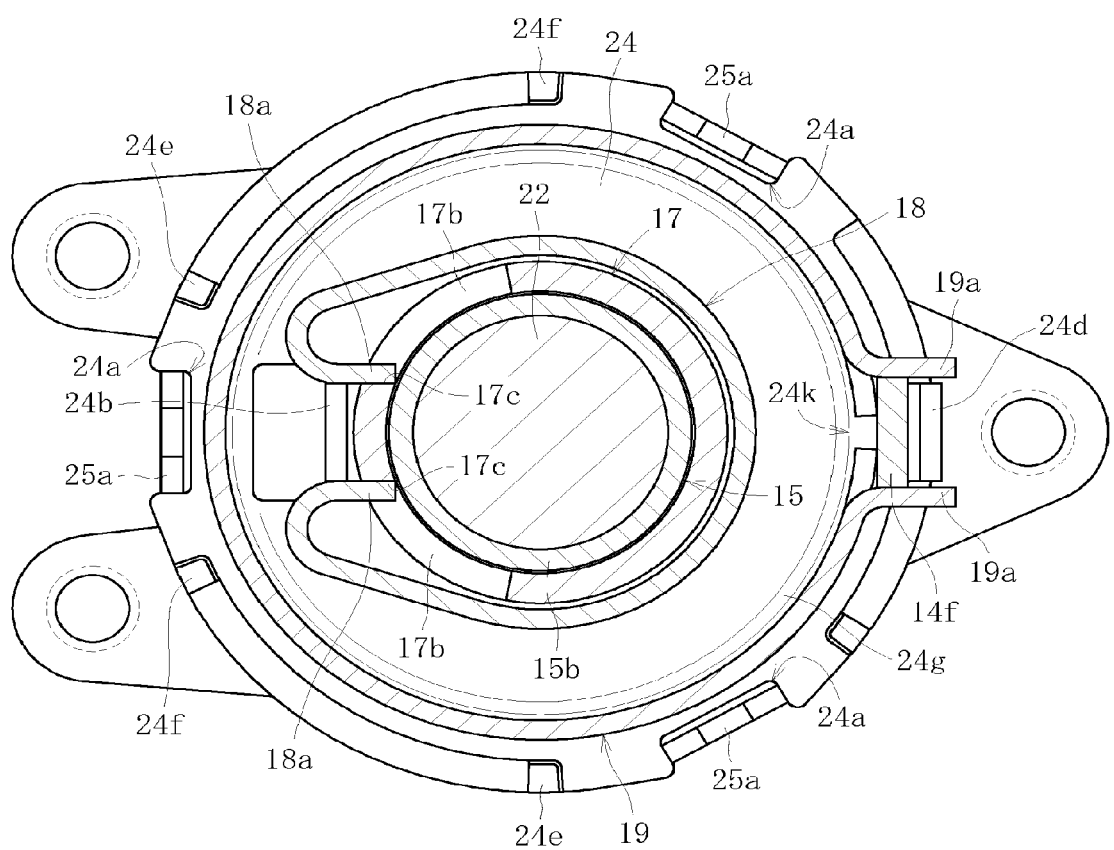
FIG. 22 A sectional view taken along the line C-C of FIG. 1.

A plurality of (three) cutout recessed portions 23a are formed on an outer periphery of the brake-side outer ring 23. Correspondingly to the cutout recessed portions 23a, a plurality of (three) cutout recessed portions 24a are similarly formed on an outer periphery of the cover 24. As illustrated in FIGS. 19a and 19b, claw portions 25a of the brake-side side plate 25 are inserted into the cutout recessed portions 23a of the brake-side outer ring 23, respectively. Further, as illustrated in FIG. 20, the claw portions 25a of the brake-side side plate 25 are inserted into the cutout recessed portions 24a of the cover 24, respectively.

The claw portions 25a of the brake-side side plate 25 are inserted into the cutout recessed portions 23a and 24a. By swaging the claw portions 25a of the brake-side side plate 25, the brake-side outer ring 23 and the cover 24 are coupled to each other and integrated with the brake-side side plate 25, to thereby form the stationary-side member. Swaging of the claw portions 25a of the brake-side side plate 25 is performed by increasing outward the distance between bisected distal end portions $25a_1$ of each of the claw portions 25a with use of a swage (not shown) (see FIG. 21).

The wedge gaps 26 are formed between the inner peripheral surface 23b of the brake-side outer ring 23 and the cam surfaces 22a of the output shaft 22 (see FIG. 5). The cover 24 is provided with the claw portion 24b protruding in the axial direction, the claw portion 24b being arranged between the two lock portions 18a of the inner centering spring 18 of the lever-side clutch portion 11 (see FIGS. 11, 23a, and 23b). The claw portion 24b of the cover 24 is formed by raising the surface of the cover 24 on the radially outer side of the claw-portion-formation position. The claw portion 24d protruding in the axial direction is formed on the outer periphery of the cover 24. The claw portion 24d is arranged between the two lock portions 19a of the outer centering spring 19 of the lever-side clutch portion 11 (see FIGS. 12a, 23a and 23b).

Figure 23A:
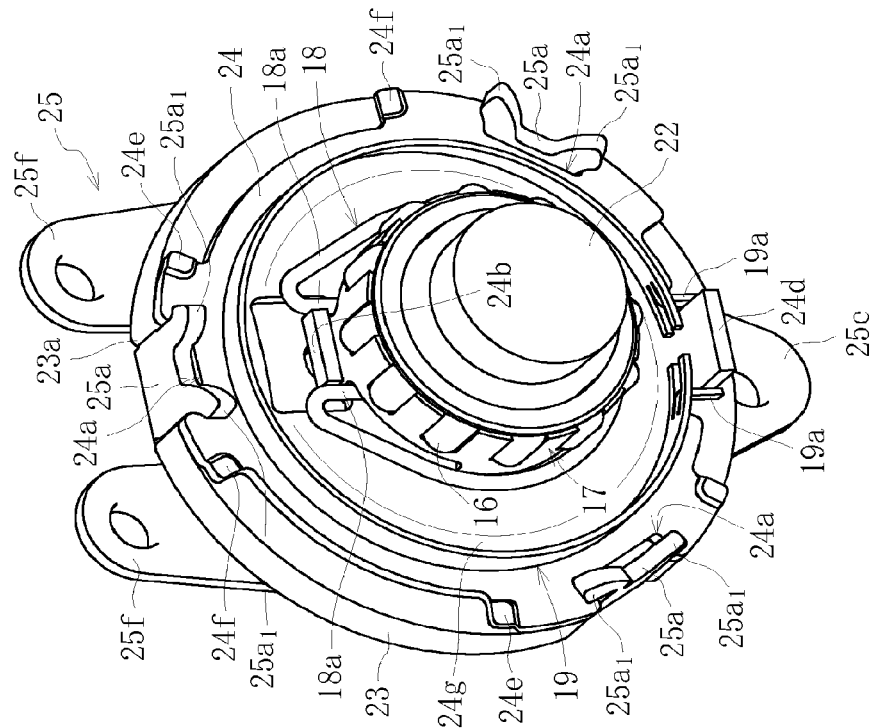
FIG. 23aA perspective view illustrating a state before the retainer is assembled to the brake-side side plate, the brake-side outer ring, the cover, and the inner centering spring.
Figure 23B:
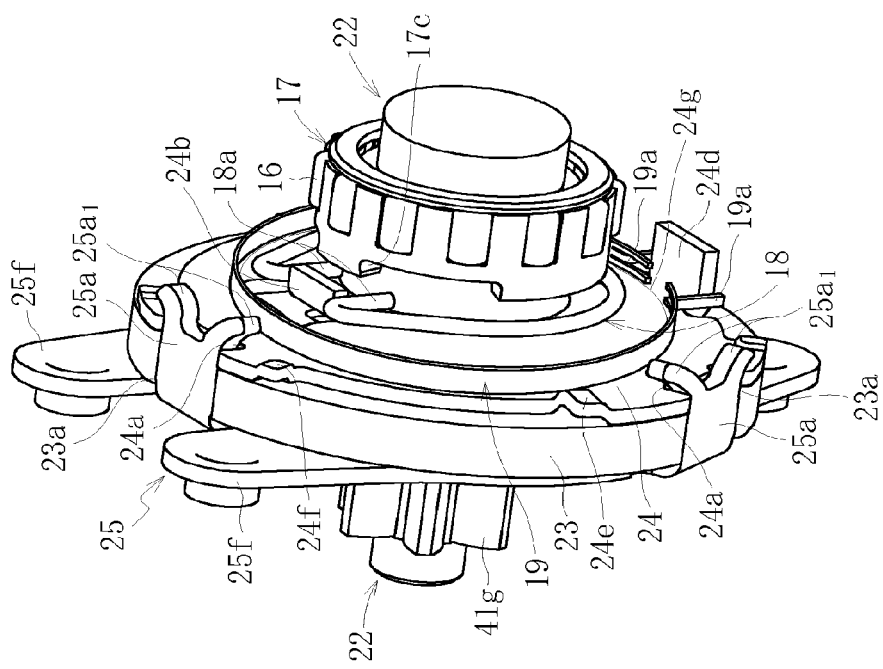
FIG. 23bA perspective view illustrating a state after the retainer is assembled to the brake-side side plate, the brake-side outer ring, the cover, and the inner centering spring.

Two pairs of the lock portions 24e and 24f are formed by stepping on the outer periphery of the cover 24 (see FIGS. 23a and 23b). In a state in which the cover 24 is held in contact with the end surface of the brake-side outer ring 23, in accordance with rotation of the lever-side outer ring 14, the lock portions 24e and 24f are allowed to be brought into abutment, in a rotational direction, on the claw portions 14g, which slide on the end surface of the brake-side outer ring 23. As a result, the lock portions 24e and 24f function as rotation stoppers for restricting an operating angle of the operation lever. In other words, when the lever-side outer ring 14 is rotated through operation of the operation lever, the claw portions 14g thereof move along the outer periphery of the cover 24 between the lock portions 24e and 24f of the cover 24.

On the outer periphery of the brake-side sideplate 25, one flange portion 25e and two flange portions 25f are provided as clutch mounting portions with respect to the seat-lifter section (see FIGS. 2 to 4). In distal end portions of those three flange portions 25e and 25f, there are formed, by boring, mounting holes 25g and 25h for allowing mounting with respect to the seat-lifter section, and there are protrudingly formed, in the axial direction, cylindrical portions 25i and 25j in a manner of surrounding the mounting holes 25g and 25h.

Figure 18C:
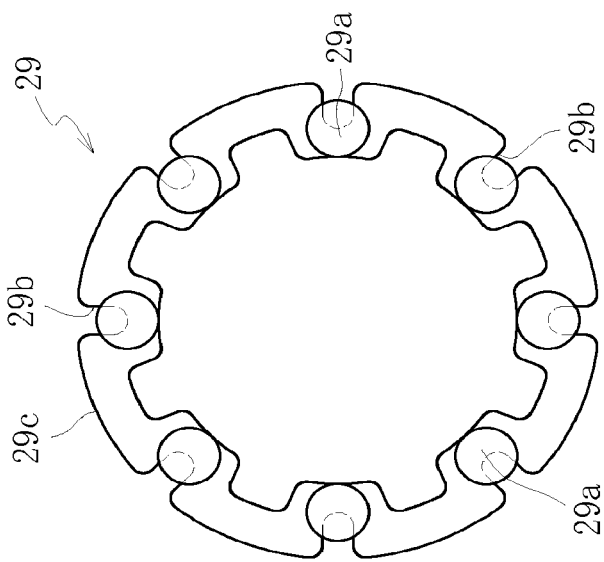
Figure 18A:
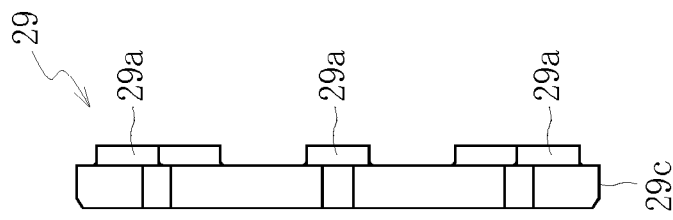
FIG. 18aA front view of a friction ring.
Figure 18B:
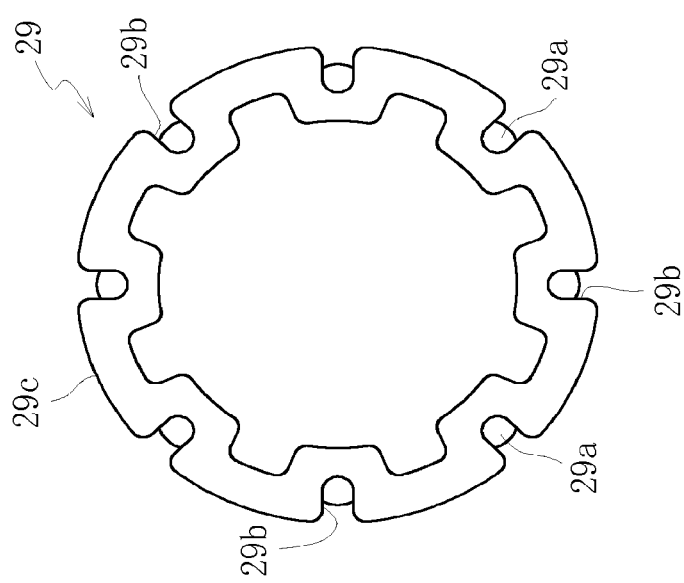

FIGS. 18a to 18c illustrate the friction ring 29 made of a resin. On an end surface of the friction ring 29, the plurality of circular protrusions 29a are equiangularly formed. By press-fitting and engaging the protrusions 29a into the holes 25c of the brake-side side plate 25, the friction ring 29 is fixed to the brake-side side plate 25 (see FIGS. 1 and 3).

In the case of press-fitting of the protrusions 29a, an engagement state with the holes 25c can be achieved due to elastic deformation of the protrusions 29a made of a resin material. By adopting a press-fit engagement structure of the protrusions 29a and the holes 25c, it is possible to prevent the friction ring 29 from falling off from the brake-side side plate 25 due to handling during transportation or the like. As a result, it is possible to increase handling properties at the time of assembly.

Figure 14C:
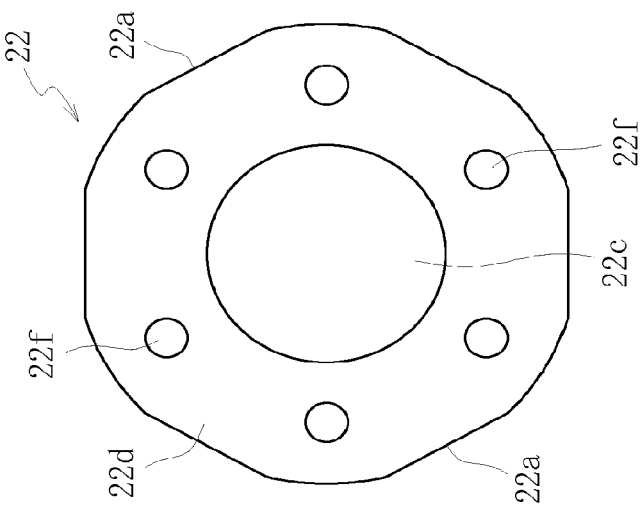
Figure 14A:
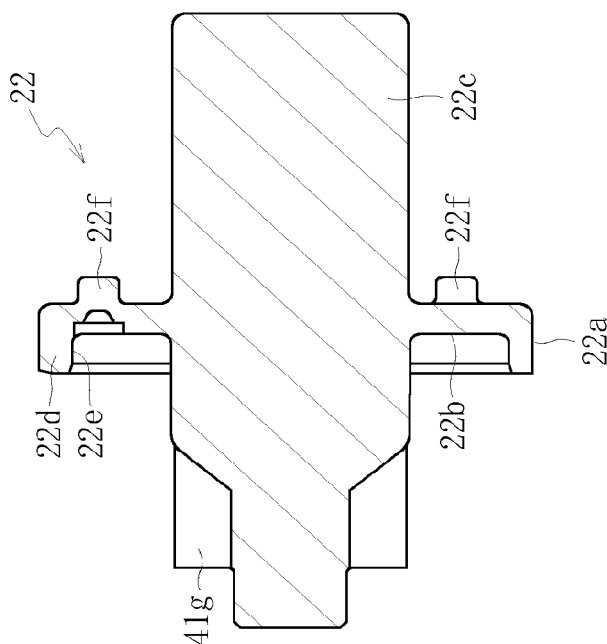
FIG. 14aA sectional view of the output shaft.
Figure 14B:
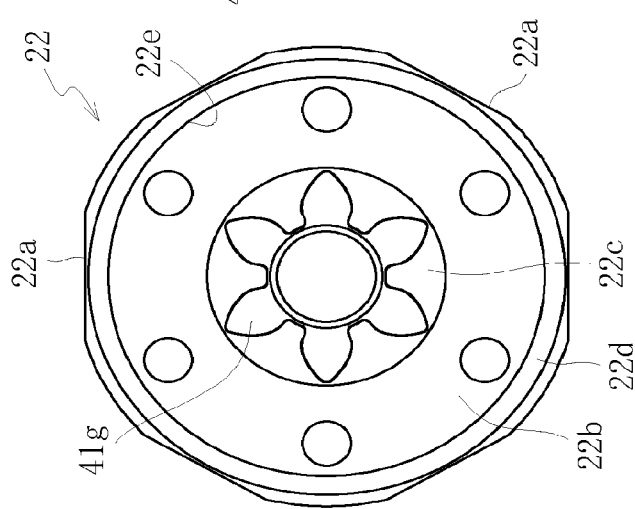

The friction ring 29 is press-fitted to an inner peripheral surface 22e of the annular recessed portion 22b formed in the larger diameter portion 22d of the output shaft 22 with fastening allowance (see FIGS. 13a, 14a and 14b). Due to a frictional force generated between an outer peripheral surface 29c of the friction ring 29 and the inner peripheral surface 22e of the annular recessed portion 22b of the output shaft 22, rotational resistance is imparted to the output shaft 22.

On the outer peripheral surface 29c of the friction ring 29, there are equiangularly formed a plurality of recessed groove-like slits 29b (see FIG. 5). With provision of the slits 29b as in this case, elasticity may be imparted to the friction ring 29. Thus, a rate of change in sliding torque is not increased with respect to inner diameter tolerance of the output shaft 22 and outer diameter tolerance of the friction ring 29.

In other words, it is possible to reduce a setting range of rotational resistance imparted by the frictional force generated between the outer peripheral surface 29c of the friction ring 29 and the inner peripheral surface 22e of the annular recessed portion 22b of the output shaft 22, and hence to appropriately and easily set the degree of the rotational resistance. Further, the slits 29b serve as grease pools, and hence it is possible to suppress abrasion of the outer peripheral surface 29c of the friction ring 29 due to sliding with respect to the inner peripheral surface 22e of the annular recessed portion 22b of the output shaft 22.

Description is made on operation of the lever-side clutch portion 11 and the brake-side clutch portion 12 of the clutch unit X structured as described above.

In the lever-side clutch portion 11, when the input torque is applied to the lever-side outer ring 14, the cylindrical rollers 16 are engaged into the wedge gaps 20 between the lever-side outer ring 14 and the inner ring 15. The inner ring 15 is rotated with torque transmitted to the inner ring 15 through the intermediation of the cylindrical rollers 16. Simultaneously, an elastic force is accumulated in both the centering springs 18 and 19 in accordance with the rotation of the lever-side outer ring 14 and the retainer 17. When the input torque is interrupted, the lever-side outer ring 14 and the retainer 17 are restored to a neutral state with the elastic force of both the centering springs 18 and 19. Meanwhile, the inner ring 15 is maintained at the fixed rotational position. Accordingly, the inner ring 15 is rotated in an inching manner with repetitive rotation of the lever-side outer ring 14, in other words, pumping operation of the operation lever.

In the brake-side clutch portion 12, when reverse-input torque is input to the output shaft 22, the plate spring 28 imparts a repulsive force to the cylindrical rollers 27 of each pair, and thus the cylindrical rollers 27 are engaged into the wedge gap 26 between the output shaft 22 and the brake-side outer ring 23 so as to lock the output shaft 22 with respect to the brake-side outer ring 23. Therefore, the torque reversely input from the output shaft 22 is locked by the brake-side clutch portion 12 so as to interrupt back-flow of the torque reversely input to the lever-side clutch portion 11.

Meanwhile, the torque input from the lever-side outer ring 14 is input to the inner ring 15 through the intermediation of the lever-side clutch portion 11. When the inner ring 15 is brought into abutment on the cylindrical rollers 27 and presses the cylindrical rollers 27 against the elastic force of the plate springs 28, the cylindrical rollers 27 are disengaged from the wedge gaps 26 and a locked state of the output shaft 22 is released. As a result, the output shaft 22 is allowed to be rotated. When the inner ring 15 is further rotated, clearances between the holes 15d of the inner ring 15 and the protrusions 22f of the output shaft 22 are narrowed, and the inner ring 15 is brought into abutment on the protrusions 22f of the output shaft 22 in a rotational direction. As a result, the torque input from the inner ring 15 is transmitted to the output shaft 22 through the intermediation of the protrusions 22f, and the output shaft 22 is rotated.

Figure 25:
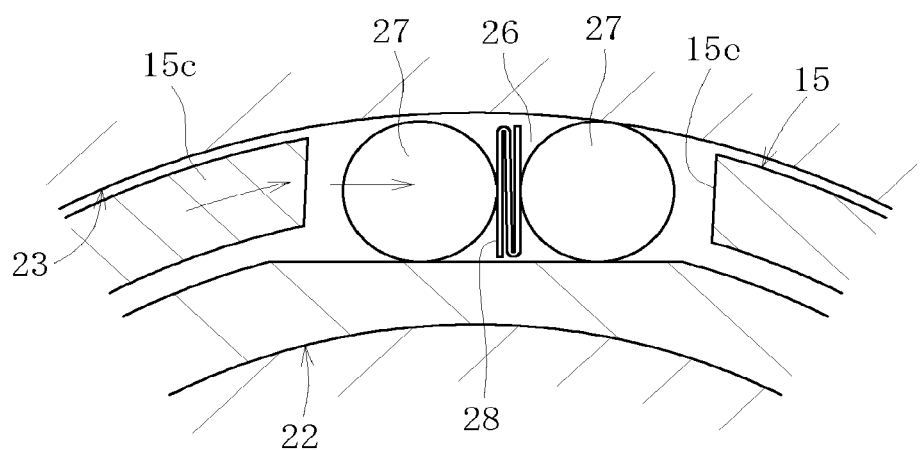
FIG. 25 An enlarged main part sectional view illustrating a state in which cylindrical rollers are flipped and thus a plate spring buckles when a locked state of the output shaft is released.

Here, in a case where high load is applied to the output shaft 22, contact pressure generated between the cylindrical rollers 27 is increased. As a result, when the cylindrical rollers 27 are disengaged from the wedge gap 26 so as to release a locked state of the output shaft 22, as illustrated in FIG. 25, one engaging cylindrical roller (cylindrical roller 27 on the left side of FIG. 25), which is pressed by the larger diameter portion 15c of the inner ring 15 functioning as the retainer, is flipped toward the other cylindrical roller (cylindrical roller 27 on the right side of FIG. 25), and thus the plate spring 28 may buckle. When the plate spring 28 buckles in this manner, each of the cylindrical rollers 27 cannot be restored to an initial position after releasing the locking. Further, there is a fear in that vibration generated at the moment at which the cylindrical rollers 27 are flipped causes noises.

In the clutch unit according to the above-mentioned embodiment, all the pockets 15e are set to have the same circumferential width dimensions, the pockets 15e being formed equiangularly in the larger diameter portion 15c of the inner ring 15, for accommodating the cylindrical rollers 27 and the plate springs 28. However, as well as the width dimensions of the pockets 15e, an inner diameter dimension of the brake-side outer ring 23, a roundness of the inner diameter of the brake-side outer ring 23, outer diameter dimensions of the cylindrical rollers 27, and a cam surface dimension of the output shaft 22 vary. Accordingly, when the cylindrical rollers 27 are disengaged from the wedge gaps 26 so as to release the locked state of the output shaft 22, it may be difficult to disengage all the cylindrical rollers 27 from the wedge gaps 26 at the same time.

As described above, in a case where it is difficult to disengage all the cylindrical rollers 27 from the wedge gaps 26 at the same time, when the cylindrical rollers 27 are disengaged from the wedge gaps 26 so as to release the locked state of the output shaft 22, the contact pressure, which is generated between the cylindrical rollers 27 due to high load applied to the output shaft 22, is concentrated on the cylindrical roller 27 that is disengaged from the wedge gap 26 last. As a result, the cylindrical rollers 27 are flipped, and hence the plate springs 28 are more likely to buckle. Accordingly, it is extremely difficult to restore each of the cylindrical rollers 27 to an initial position, and noises are more likely to occur at the moment at which the cylindrical rollers 27 are flipped.

Figure 26:
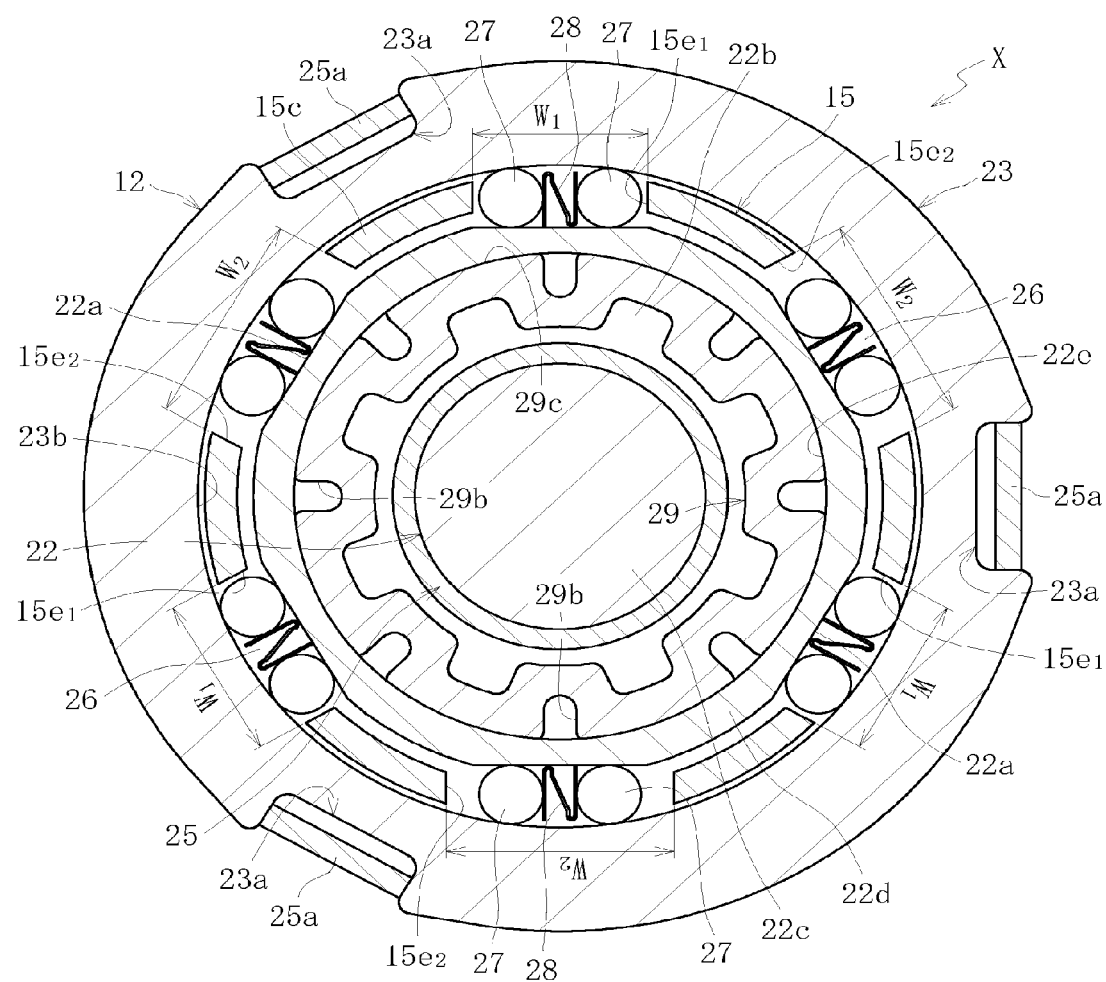
FIG. 26 A sectional view illustrating a brake-side clutch portion according to another embodiment of the present invention, in which width dimensions of pockets are set different.
Figure 27:
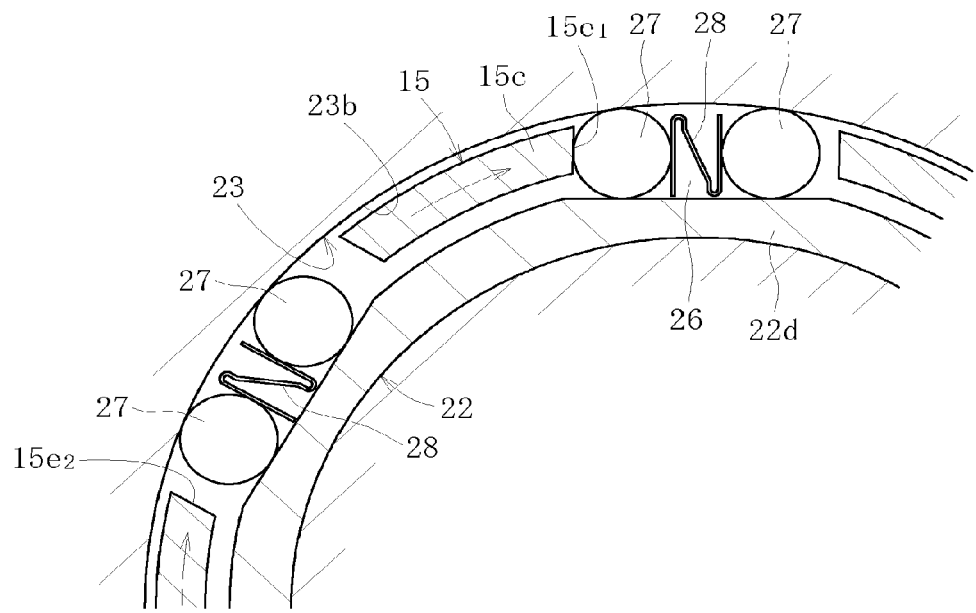
FIG. 27 An enlarged main part sectional view illustrating a state in which, under the state illustrated in FIG. 26, an inner ring presses cylindrical rollers accommodated in a pocket having a small width and thus the cylindrical rollers are disengaged from a wedge gap.
Figure 28:
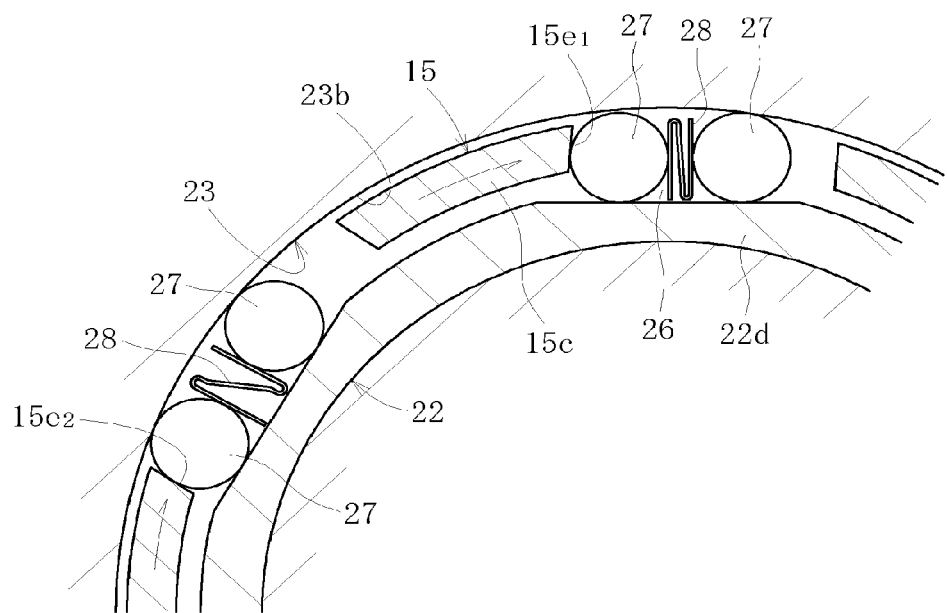
FIG. 28 An enlarged main part sectional view illustrating a state in which, under the state illustrated in FIG. 27, the inner ring presses cylindrical rollers accommodated in a pocket having a large width and thus the cylindrical rollers are disengaged from a wedge gap.

In this context, when the locked state of the output shaft 22 is released, in order to suppress concentration of the contact pressure generated between the cylindrical rollers 27, and to prevent occurrence of noises at the moment at which the cylindrical rollers 27 are flipped, in the clutch unit according to this embodiment, as illustrated in FIG. 26, width dimensions $W_1$ of pockets $15e_1$ are set different from width dimensions $W_2$ of pockets $15e_2$ ($W_1<W_2$). That is, the pockets $15e_1$ having small widths and the pockets $15e_2$ having large widths are arranged alternately in the peripheral direction. As described above, the pockets $15e_1$ having small widths and the pockets $15e_2$ having large widths are arranged alternately in the peripheral direction, and hence when the cylindrical rollers 27 are disengaged from the wedge gaps 26 so as to release the locked state of the output shaft 22, not all the cylindrical rollers 27 are disengaged from the wedge gaps 26 at the same time, but the following operation is provided instead. Specifically, as illustrated in FIG. 27, by being pressed by the larger diameter portion 15c of the inner ring 15, the cylindrical rollers 27 accommodated in the pocket $15e_1$ having a small width are disengaged from the wedge gap 26 prior to the cylindrical rollers 27 accommodated in the pocket $15e_2$ having a large width. Then, as illustrated in FIG. 28, by being pressed by the larger diameter portion 15c of the inner ring 15, the cylindrical rollers 27 accommodated in the pocket $15e_2$ having the large width are disengaged from the wedge gap 26. In this way, all the cylindrical rollers 27 are disengaged from the wedge gaps 26 one side at a time in a step-by-step and balanced manner.

Figure 29:
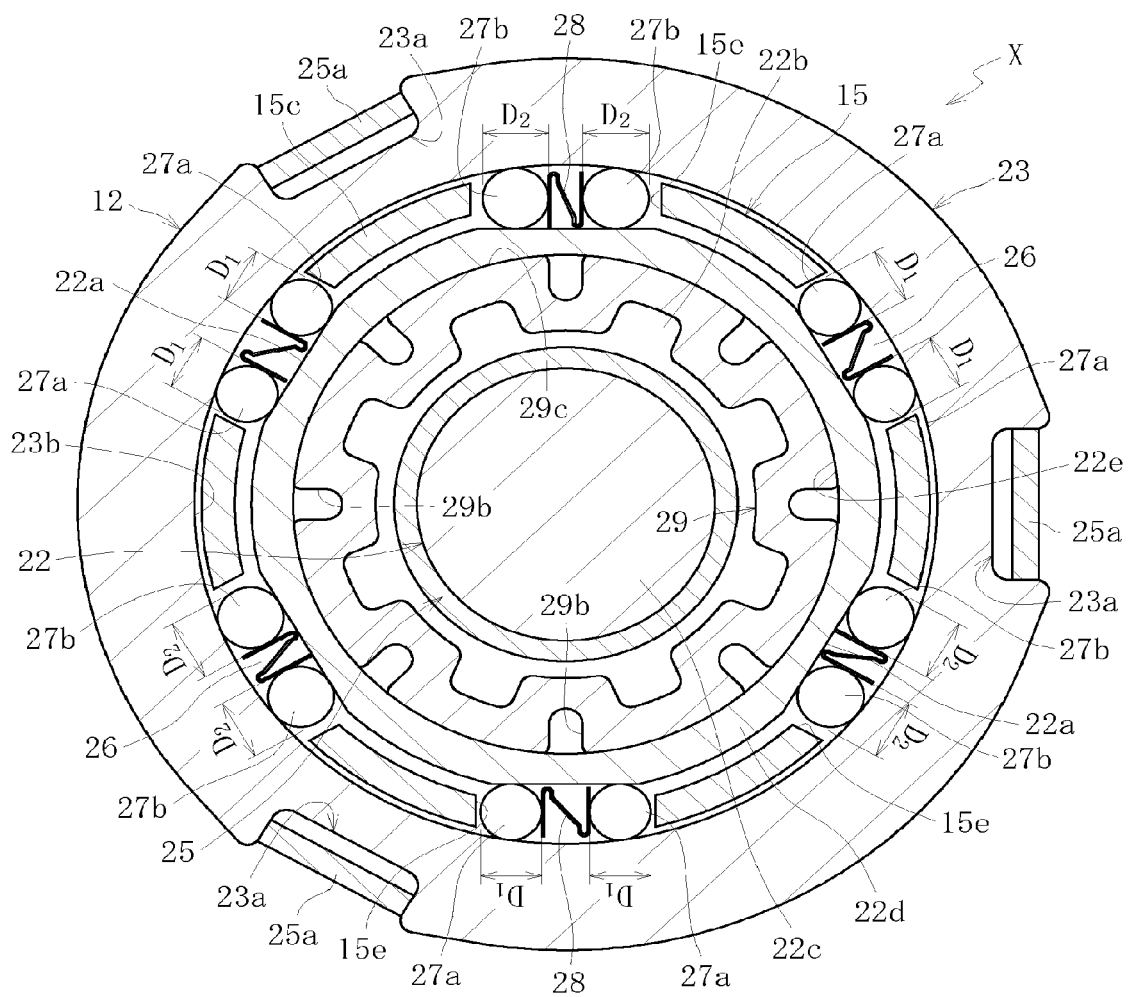
FIG. 29 A sectional view illustrating a brake-side clutch portion according to still another embodiment of the present invention, in which outer diameter dimensions of cylindrical rollers are set different.
Figure 30:
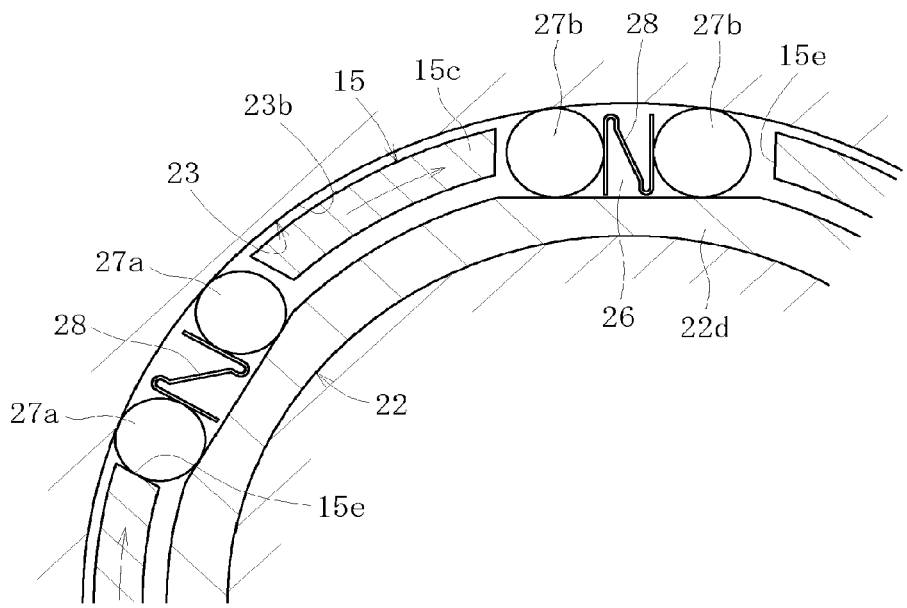
FIG. 30 An enlarged main part sectional view illustrating a state in which, under the state illustrated in FIG. 29, the inner ring presses cylindrical rollers having small diameters and thus the cylindrical rollers are disengaged from a wedge gap.
Figure 31:
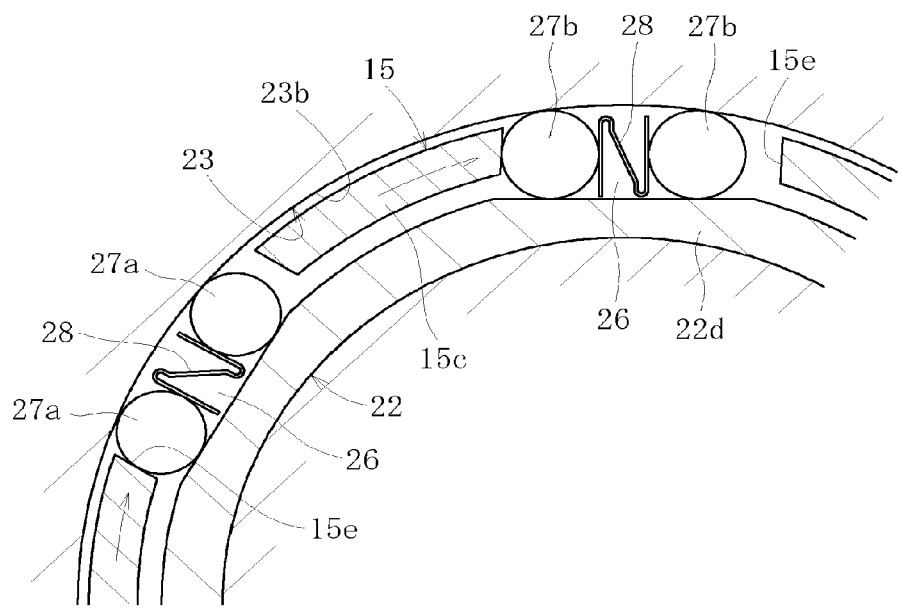
FIG. 31 An enlarged main part sectional view illustrating a state in which, under the state illustrated in FIG. 30, the inner ring presses cylindrical rollers having large diameters and thus the cylindrical rollers are disengaged from a wedge gap.

Besides setting of the width dimensions $W_1$ of the pockets $15e_1$ to be different from the width dimensions $W_2$ of the pockets $15e_2$ as in this embodiment, as another embodiment, as illustrated in FIG. 29, outer diameter dimensions $D_1$ of cylindrical rollers 27a of each pair may be set different from outer diameter dimensions $D_2$ of cylindrical rollers 27b of each pair ($D_1<D_2$). That is, the cylindrical rollers 27a having small diameters (outer diameter dimensions $D_1$) and the cylindrical rollers 27b having large diameters (outer diameter dimensions $D_2$) may be arranged alternately in the peripheral direction. As described above, the cylindrical rollers 27a having small diameters and the cylindrical rollers 27b having large diameters are arranged alternately in the peripheral direction, and hence the following operation is provided. Specifically, when the locked state of the output shaft 22 is released, as illustrated in FIG. 30, by being pressed by the larger diameter portion 15c of the inner ring 15, the cylindrical rollers 27a having small diameters are disengaged from the wedge gap 26 prior to the cylindrical rollers 27b having large diameters. Then, as illustrated in FIG. 31, by being pressed by the larger diameter portion 15c of the inner ring 15, the cylindrical rollers 27b having large diameters are disengaged from the wedge gap 26. In this way, all the cylindrical rollers 27a and 27b are disengaged from the wedge gaps 26 one side at a time in a step-by-step and balanced manner.

As described above, the pockets $15e_1$ having small widths and the pockets $15e_2$ having large widths are arranged alternately in the peripheral direction, or the cylindrical rollers 27a having small diameters and the cylindrical rollers 27b having large diameters are arranged alternately in the peripheral direction, and thus the following operation is provided. Specifically, even in a case where high load is applied to the output shaft 22, when the locked state of the output shaft 22 is released, it is possible to avoid concentration of the contact pressure, which is generated between the cylindrical rollers 27 (27a, 27b) due to high load applied to the output shaft 22, on the cylindrical roller 27 (27a, 27b) that is disengaged from the wedge gap 26 last. Accordingly, it is possible to suppress concentration of the contact pressure generated between the cylindrical rollers 27 (27a, 27b), and to prevent occurrence of noises at the moment at which the cylindrical rollers (27a, 27b) are flipped.

Note that, in the above-mentioned embodiments, description is made of a case where six pockets $15e_1$ and $15e_2$ ($15e$) are provided. In a case where the larger diameter portion 15c of the inner ring 15 functioning as the retainer comprises seven or more pockets $15e_1$ and $15e_2$ ($15e$), the following structure is adopted.

Figure 32:
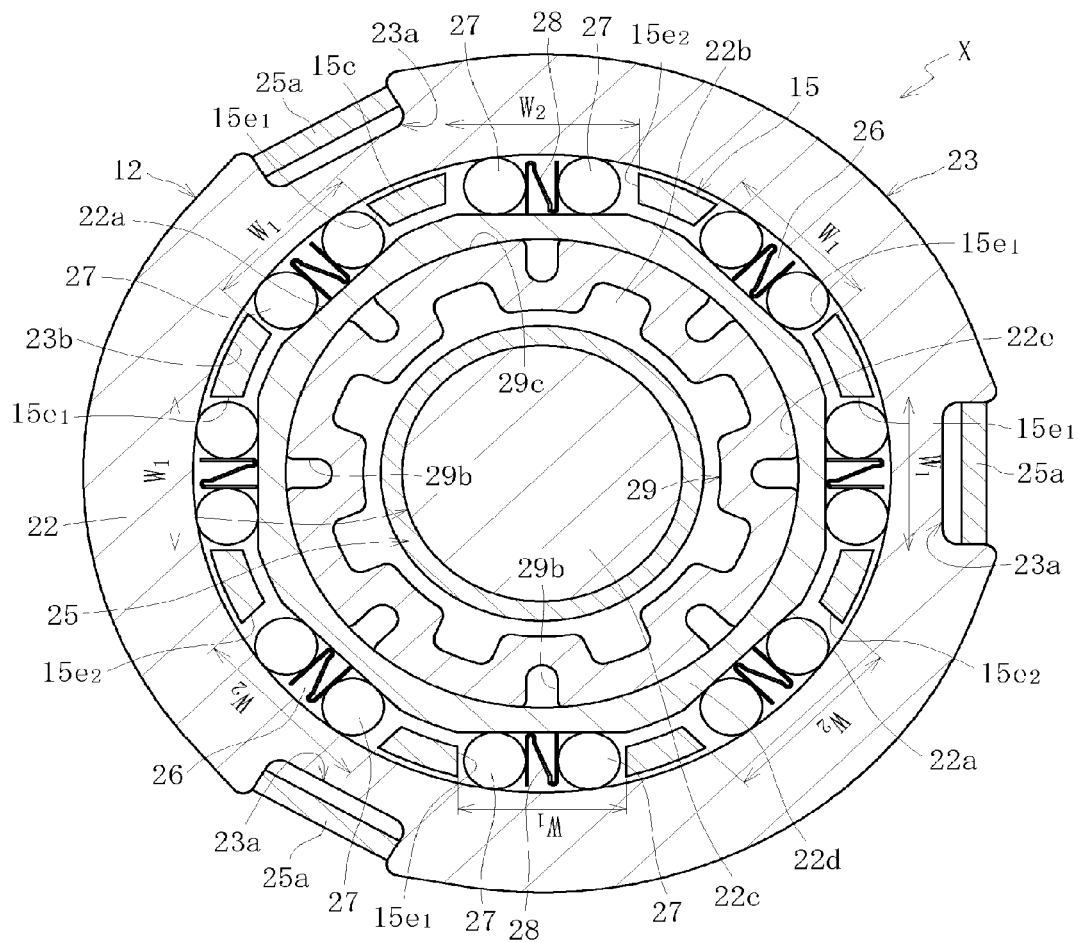
FIG. 32 A sectional view illustrating a brake-side clutch portion according to still another embodiment of the present invention, in which width dimensions of pockets are set different in a case of comprising seven pockets.

In the structure in which the width dimensions $W_1$ of the pockets $15e_1$ are set different from the width dimensions $W_2$ of the pockets $15e_2$, in a case where eight pockets $15e_1$ and $15e_2$ are provided as in an embodiment illustrated in FIG. 32, three pockets $15e_2$ having large widths and four or more (five in this embodiment) pockets $15e_1$ having small widths are provided. With this structure, when the locked state of the output shaft 22 is released, the cylindrical rollers 27 accommodated in the four or more (five) pockets $15e_1$ having small widths are disengaged from the wedge gaps 26, and then the cylindrical rollers 27 accommodated in the minimum necessary three remaining pockets $15e_2$ having large widths are disengaged from the wedge gaps 26. As a result, concentration of the contact pressure generated between the cylindrical rollers 27 is suppressed easily.

Figure 33:
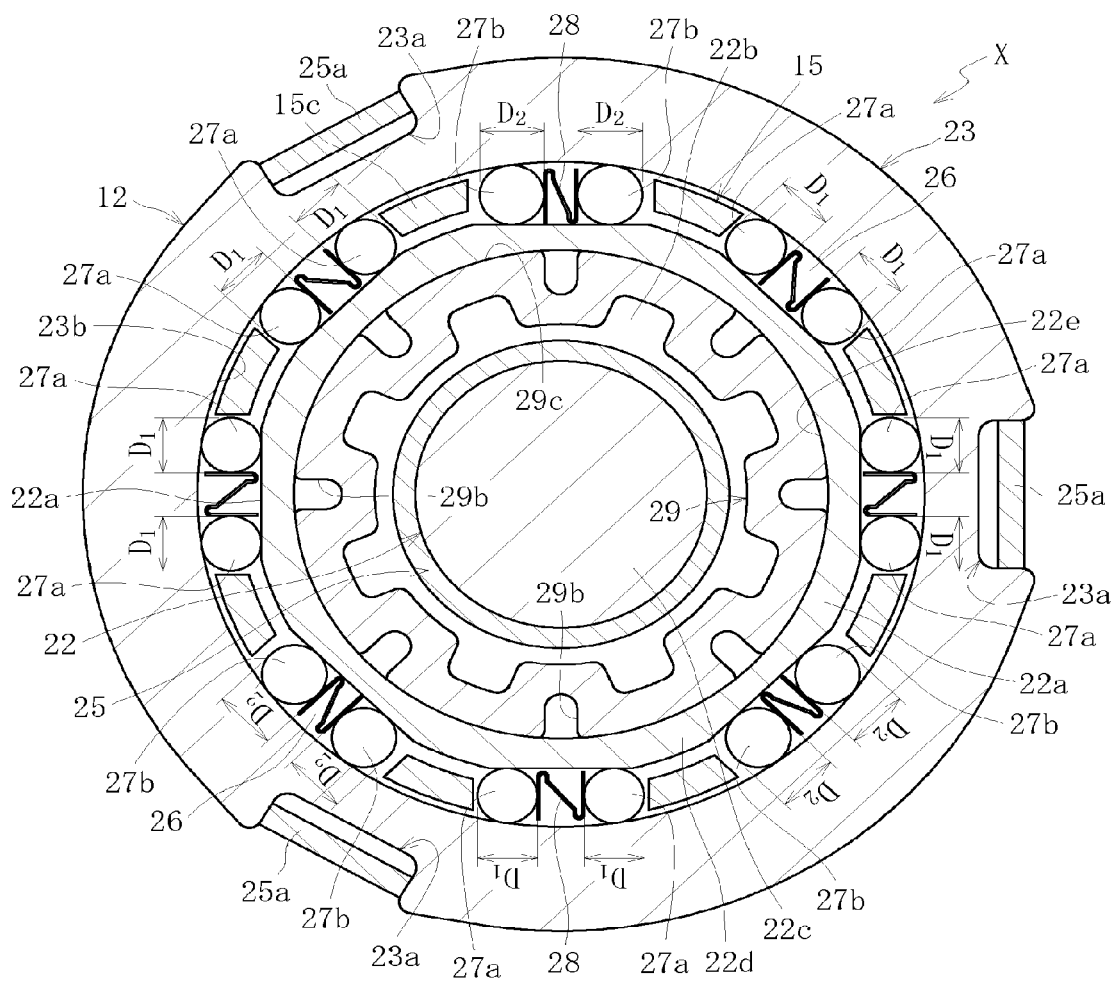
FIG. 33 A sectional view illustrating a brake-side clutch portion according to still another embodiment of the present invention, in which outer diameter dimensions of cylindrical rollers are set different in a case of comprising seven pockets.

Further, in the structure in which the outer diameter dimensions $D_1$ of the cylindrical rollers 27a are set different from the outer diameter dimensions $D_2$ of the cylindrical rollers 27b, in a case where eight pockets $15e$ are provided as in an embodiment illustrated in FIG. 33, three pairs of cylindrical rollers 27b having large diameters and four or more pairs (five pairs in this embodiment) of cylindrical rollers 27a having small diameters are provided. With this structure, when the locked state of the output shaft 22 is released, the four or more pairs (five pairs) of cylindrical rollers 27a having small diameters are disengaged from the wedge gaps 26, and then the minimum necessary three remaining pairs of cylindrical rollers 27b having large diameters are disengaged from the wedge gaps 26. As a result, concentration of the contact pressure generated between the cylindrical rollers 27a, 27b of each pair is suppressed easily.

In the above-mentioned embodiments, the output shaft 22 is locked by an elastic force of the plate spring 28, and the locked state of the output shaft 22 is released against the elastic force of the plate spring 28. Because of a shape, a plate thickness, and the like of the plate spring 28, spring load of the plate spring 28 has limitations with respect to load applied to the cylindrical rollers 27. Therefore, in a case where load applied to the cylindrical rollers 27 is increased, it is necessary to prepare means other than the plate spring 28.

Figure 34:
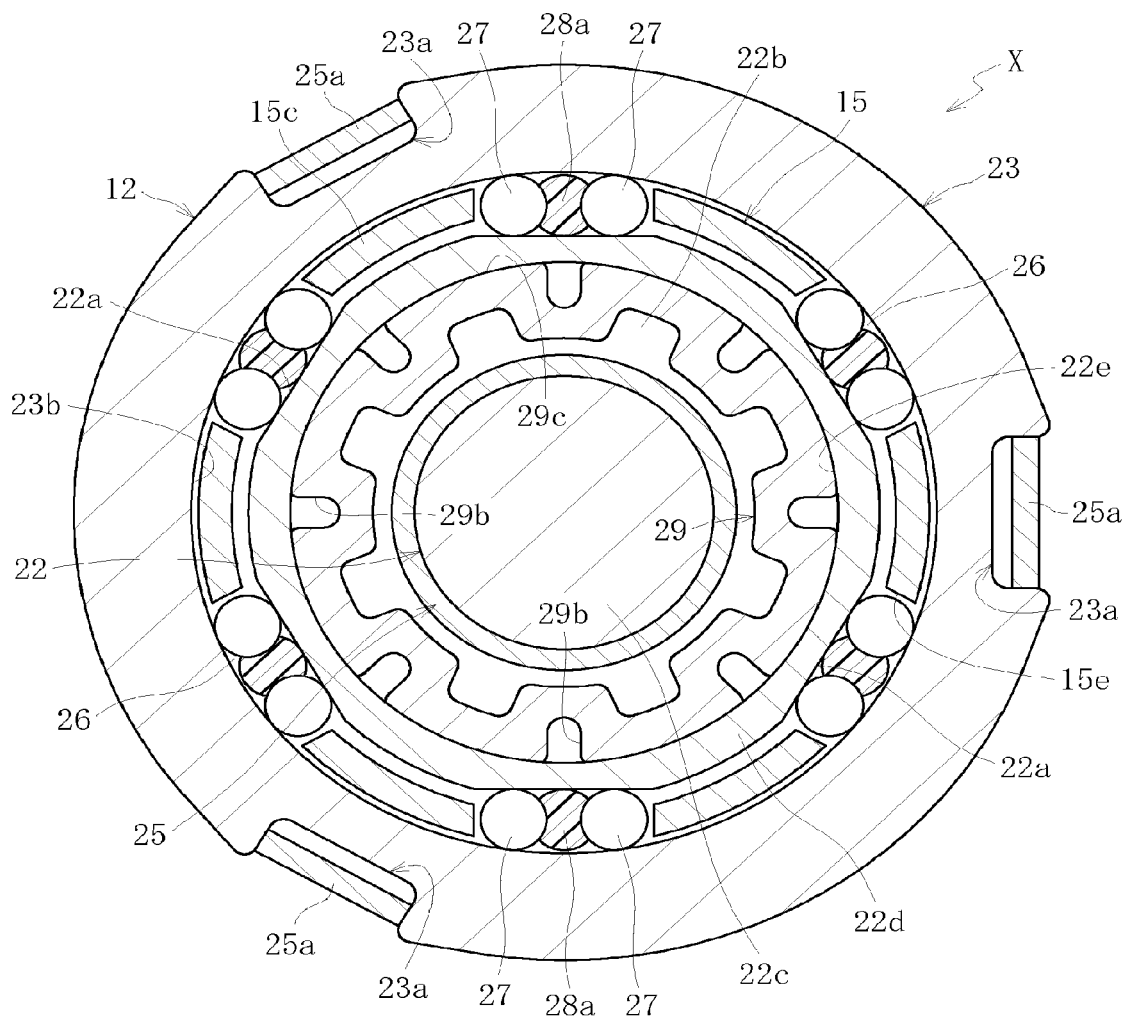
FIG. 34 A sectional view illustrating a brake-side clutch portion according to still another embodiment of the present invention, in which an elastomer member is inserted between cylindrical rollers of each pair.

In this context, when the locked state of the output shaft 22 is released, in order to forestall the situation that the cylindrical rollers 27 are flipped and thus the plate springs 28 may buckle, and to prevent occurrence of noises caused by vibration at the moment at which the cylindrical rollers 27 are flipped, instead of the plate springs 28 used in the above-mentioned embodiments, as illustrated in FIG. 34, an elastomer member 28a for imparting a repulsive force to the cylindrical rollers 27 of each pair may be inserted between the cylindrical rollers 27 of each pair.

Figure 35:
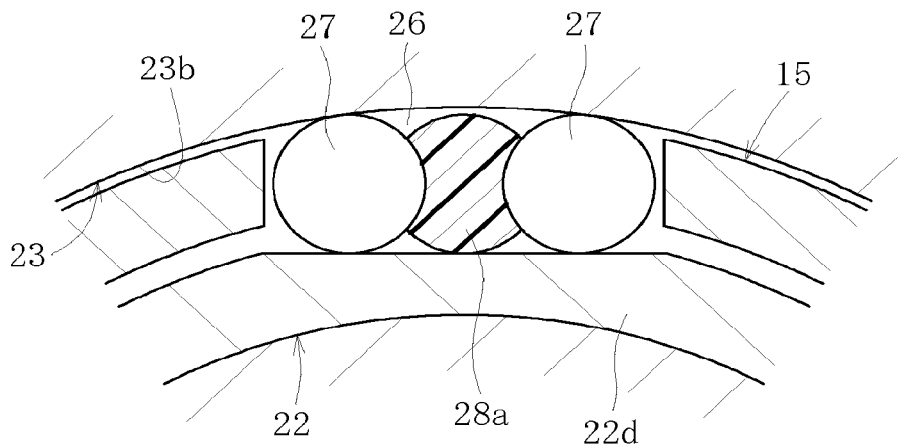
FIG. 35 An enlarged main part sectional view of FIG. 34, for illustrating an embodiment in which an elastomer member having a columnar shape is applied.

The elastomer member 28a has an outer diameter dimension larger than a gap between the cylindrical rollers 27 of each pair, and is inserted in an elastically deformed state between the cylindrical rollers 27 (see FIG. 35). That is, as illustrated in FIG. 35, regions of the elastomer member 28a abutting on the cylindrical rollers 27 are elastically deformed and dented by a pressing force applied from the cylindrical rollers 27. With this, an elastic restoring force of the elastomer member 28a acts as a repulsive force to be imparted to the cylindrical rollers 27, and hence the repulsive force is easily imparted to the cylindrical rollers 27.

Further, the elastomer member 28a has a columnar shape and an axial dimension equal to or smaller than axial dimensions of the cylindrical rollers 27. Owing to a simple shape such as the columnar shape, a function of the elastomer member 28a, i.e., a function of imparting the repulsive force to the cylindrical rollers 27 can be exerted. Further, when the axial dimension of the elastomer member 28a is set equal to or smaller than the axial dimensions of the cylindrical rollers 27, the elastomer member 28a can reliably exert the function of imparting the repulsive force to the cylindrical rollers 27 without interfering with other components.

As described above, the output shaft 22 is locked by the elastic force of the elastomer member 28a, and the locked state of the output shaft 22 is released against the elastic force of the elastomer member 28a. In this embodiment, compared to the plate spring 28 (see FIG. 5), the elastomer member 28a inserted between the cylindrical rollers 27 of each pair and having the function of imparting the repulsive force to the cylindrical rollers 27 can easily increase the load applied to the cylindrical rollers 27.

Figure 36:
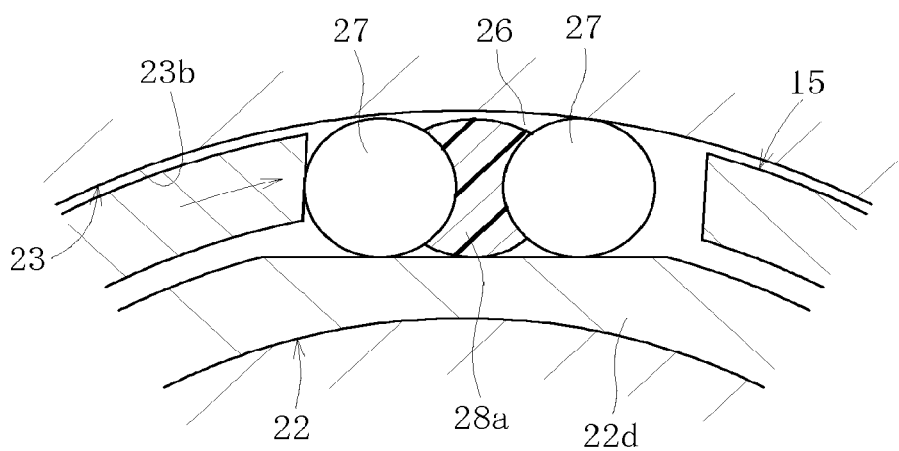
FIG. 36 A sectional view illustrating a state in which, under the state illustrated in FIG. 35, the inner ring presses cylindrical rollers and thus the cylindrical rollers are disengaged from a wedge gap.

As a result, even in a case where high load is applied to the output shaft 22, when the cylindrical rollers 27 are disengaged from the wedge gaps 26 so as to release the locked state of the output shaft 22, the following operation is provided. Specifically, as illustrated in FIG. 36, owing to the elastomer member 28a that does not buckle unlike the plate spring 28 (see FIG. 25), one engaging cylindrical roller (cylindrical roller 27 on the left side of FIG. 36) pressed by the inner ring 15 is not flipped toward the other cylindrical roller (cylindrical roller 27 on the right side of FIG. 36), and the elastomer member 28a can reliably restore each of the cylindrical rollers 27 to an initial position after releasing the locking. Accordingly, it is possible to prevent occurrence of noises caused by vibration at the moment at which the cylindrical rollers 27 are flipped.

Figure 37:
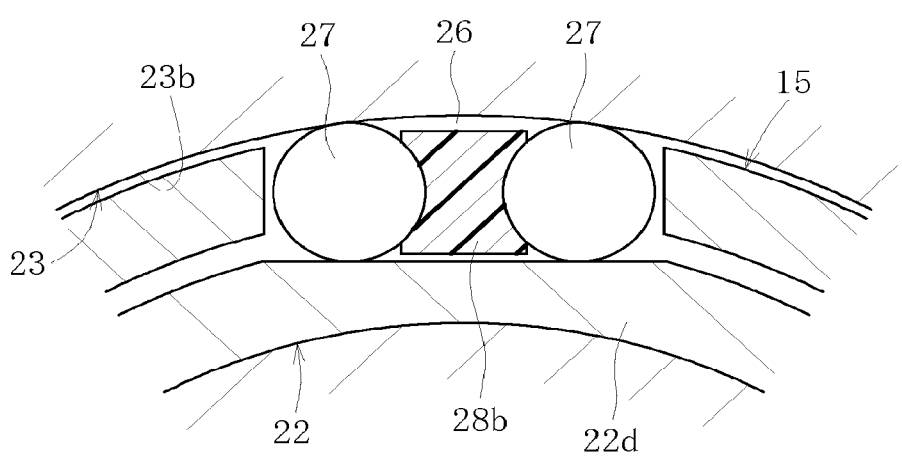
FIG. 37 A sectional view illustrating still another embodiment in which an elastomer member having a quadrangular prism shape is applied.

Note that, the elastomer member 28a is made of any one of a thermosetting elastomer and an elastically deformable resin material. This selection of anyone of the thermosetting elastomer and the elastically deformable resin material enables easy manufacture of the elastomer member 28a. Further, as illustrated in FIG. 37, the elastomer member 28b may have a quadrangular prism shape, and a sectional shape of the elastomer member may be set arbitrarily.

Figure 38:
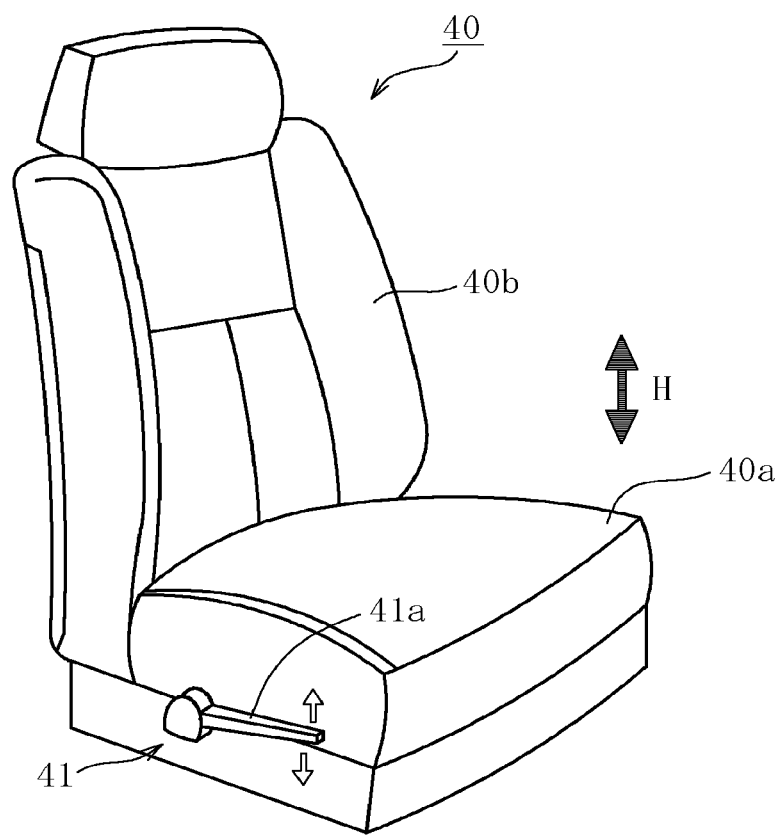
FIG. 38 A conceptual view illustrating a seat of an automobile.

The clutch unit X provided with the structure as described above in detail is used while being incorporated into, for example, an automobile seat-lifter section. FIG. 38 illustrates a seat 40 installed in a cabin of an automobile. The seat 40 comprises a sitting seat 40a, a backrest seat 40b, and the seat-lifter section 41 for adjusting a height H of the sitting seat 40a. Adjustment of the height H of the sitting seat 40a is performed with an operation lever 41a of the seat-lifter section 41.

Figure 39A:
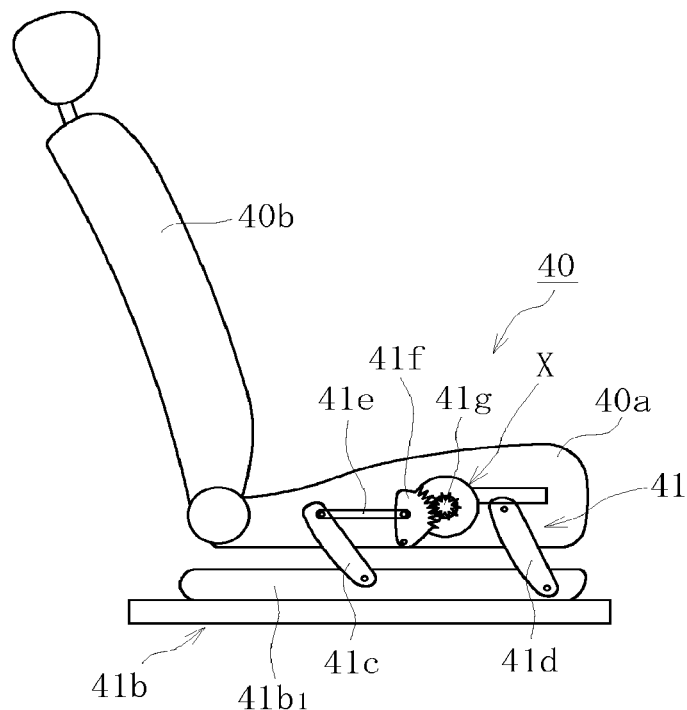
FIG. 39aA conceptual view illustrating a structural example of a seat-lifter section.

FIG. 39a is a conceptual view of a structural example of the seat-lifter section 41. One ends of link members 41c and 41d are pivotally mounted to a slide movable member 41b₁ of a seat slide adjuster 41b. The other ends of the link members 41c and 41d are pivotally mounted to the sitting seat 40a. The other end of the link member 41c is pivotally mounted to a sector gear 41f through intermediation of a link member 41e. The sector gear 41f is pivotally mounted to the sitting seat 40a, and pivotable about a fulcrum 41f₁. The other end of the link member 41d is pivotally mounted to the sitting seat 40a.

The clutch unit X described above in this embodiment is fixed to an appropriate position of the sitting seat 40a. Fixation of the clutch unit X to the sitting seat 40a is fixation by swaging to a seat frame (not shown) of the sitting seat 40a, in which the three flange portions 25e and 25f of the brake-side side plate 25 are subjected to plastic deformation in such a manner that the distal end portions of the cylindrical portions 25i and 25j are increased in diameter outward.

Meanwhile, the operation lever 41a made of, for example, a resin is coupled to the lever-side side plate 13 of the lever-side clutch portion 11, and the pinion gear 41g meshing with the sector gear 41f as a rotary member is provided to the output shaft 22 of the brake-side clutch portion 12. As illustrated in FIGS. 1, 13a, 13b, 14a, and 14b, the pinion gear 41g is integrally formed at a distal end portion of the shaft portion 22c of the output shaft 22.

Figure 39B:
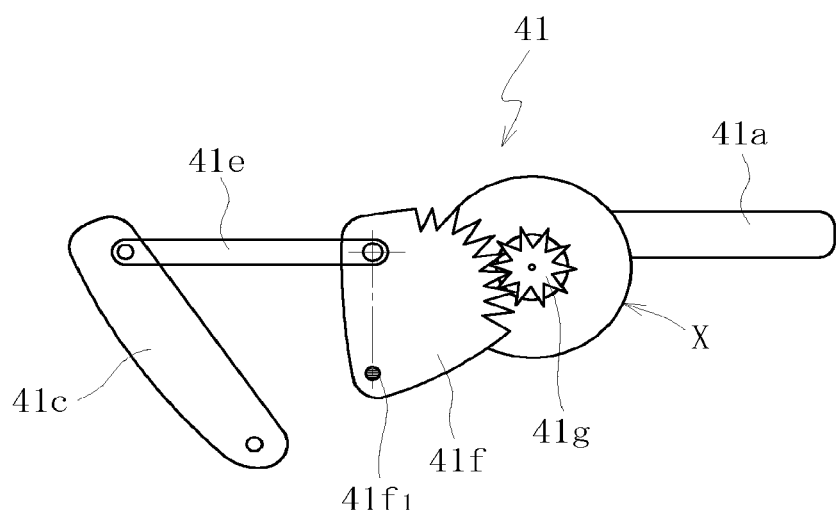

In FIG. 39b, when the operation lever 41a is pivoted counterclockwise (upward), torque input in that direction is transmitted to the pinion gear 41g through intermediation of the clutch unit X so that the pinion gear 41g pivots counterclockwise. Then, the sector gear 41f meshing with the pinion gear 41g pivots clockwise so as to pull the other end of the link member 41c through intermediation of the link member 41e. As a result, the link member 41c and the link member 41d stand together, and a seat surface of the sitting seat 40a becomes higher.

In this manner, when the operation lever 41a is released after adjustment of the height H of the sitting seat 40a, the operation lever 41a pivots clockwise with the elastic force of the two centering springs 18 and 19, and returns to the original position (restores to the neutral state). Note that, when the operation lever 41a is pivoted clockwise (downward), the seat surface of the sitting seat 40a is lowered through operation in an opposite direction as that in the case described above. Further, when the operation lever 41a is released after adjustment of the height, the operation lever 41a pivots counterclockwise and returns to the original position (restores to the neutral state).

The present invention is not limited to the above-mentioned embodiments. As a matter of course, the present invention may be carried out in various modes without departing from the spirit of the present invention. The scope of the present invention is defined by claims, and includes the meaning of an equivalent of the claims and all the modifications within the claims.

The invention claimed is:

1. A clutch unit, comprising:
   a lever-side clutch portion provided on an input side, for controlling transmission and interruption of rotational torque to an output side through lever operation; and
   a brake-side clutch portion provided on the output side, for transmitting torque input from the lever-side clutch portion to the output side and for interrupting torque reversely input from the output side, wherein:
   the lever-side clutch portion comprises:
      an input-side member to be rotated through the lever operation; and
      an elastic member provided between a stationary-side member restricted in rotation and the input-side member, for accumulating an elastic force obtained by torque input from the input-side member and for restoring the input-side member to a neutral state with the accumulated elastic force through releasing of the torque input from the input-side member, the elastic member comprises a C-shaped and band-like plate spring which comprises at least two lock portions formed by bending both ends thereof to a radially outer side;

a first of the at least two lock portions and a second of the at least two lock portions are formed at positions that are identical in a band-plate width direction; and ends of the elastic member are symmetrical with respect to a center line in a band-plate peripheral direction.

2. A clutch unit according to claim 1, wherein the first of the at least two lock portions and the second of the at least two lock portions are formed at center positions in the band-plate width direction.

3. A clutch unit according to claim 1, wherein the at least two lock portions includes four lock portions, and the first of the four lock portions and a third of the four lock portions are formed at side positions in the band-plate width direction at one of the ends of the C-shaped and band-like plate spring and the second of the four lock portions and a fourth of the four lock portions are formed at side positions in the band-plate width direction at another of the ends of the C-shaped and band-like plate spring.

4. A clutch unit according to claim 1, wherein the lever-side clutch portion and the brake-side clutch portion are incorporated in an automobile seat-lifter section.

* * * * *